United States Patent
Beeken et al.

(10) Patent No.: US 9,075,535 B2
(45) Date of Patent: *Jul. 7, 2015

(54) SOURCE CLEANING CASCADED VOLUMES USING REFERENCE COUNTS

(71) Applicant: International Business Machines Corporation, Armonk, NY (US)

(72) Inventors: Christopher B. Beeken, Eastleigh (GB); John P. Wilkinson, Salisbury (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/775,278

(22) Filed: Feb. 25, 2013

(65) Prior Publication Data
US 2013/0346713 A1    Dec. 26, 2013

Related U.S. Application Data

(63) Continuation of application No. 13/532,756, filed on Jun. 25, 2012.

(51) Int. Cl.
*G06F 12/00* (2006.01)
*G06F 13/00* (2006.01)
(Continued)

(52) U.S. Cl.
CPC ............ *G06F 3/065* (2013.01); *G06F 3/0689* (2013.01); *G06F 3/0619* (2013.01); *G06F 3/0652* (2013.01); *G06F 11/1448* (2013.01); *G06F 2201/84* (2013.01)

(58) Field of Classification Search
CPC ............ G06F 11/1446; G06F 11/1448; G06F 11/1458; G06F 3/065; G06F 2201/84; G06F 3/0652; G06F 3/0619; G06F 3/0689
USPC .......... 711/114, 161, 162, E12.013; 707/633, 707/659, 813–830
See application file for complete search history.

(56) References Cited

U.S. PATENT DOCUMENTS

| | | | |
|---|---|---|---|
| 5,522,037 | A | 5/1996 | Kitagawa et al. |
| 7,395,378 | B1 | 7/2008 | Pemdharkar et al. |

(Continued)

FOREIGN PATENT DOCUMENTS

| | | |
|---|---|---|
| CN | 1726472 | 1/2006 |
| CN | 1926819 | 3/2007 |

OTHER PUBLICATIONS

Microsoft Technet; How Volume Shadow Copy Service Works; retrieved from http://technet.microsoft.com/en-us/library/cc785914(d=printer,v=W3.10).aspx; Mar. 28, 2003.

(Continued)

*Primary Examiner* — Yong Choe
*Assistant Examiner* — Shane Woolwine
(74) *Attorney, Agent, or Firm* — James L. Baudino

(57) ABSTRACT

A system, process, and product for source cleaning cascaded volumes include the ability to store a number of cascaded backup volumes and prepare received writes for storage. The system, process, and product also include the ability to examine a metadata set associated with a volume region for a write to determine whether another volume depends on the region and write the new data to the region if another volume is not dependent. The system, process, and product further include the ability to determine whether a write is for a volume region that is a canonical source and, if so, decrement a reference count in a metadata set associated with the region and establish the volume of the region as a canonical source for a metadata set associated with a new metadata set location identifier.

12 Claims, 13 Drawing Sheets

(51) Int. Cl.
*G06F 13/28* (2006.01)
*G06F 3/06* (2006.01)
*G06F 11/14* (2006.01)

(56) References Cited

U.S. PATENT DOCUMENTS

| | | | |
|---|---|---|---|
| 7,669,024 B2 | 2/2010 | Fuente | |
| 7,733,782 B2 | 6/2010 | Sunnell et al. | |
| 7,904,684 B2 | 3/2011 | Werner et al. | |
| 2006/0053259 A1* | 3/2006 | Berkowitz et al. | 711/162 |
| 2008/0215837 A1 | 9/2008 | Agombar et al. | |
| 2009/0106332 A1 | 4/2009 | Agombar et al. | |
| 2009/0319735 A1 | 12/2009 | Agombar et al. | |
| 2010/0036996 A1 | 2/2010 | Agombar et al. | |
| 2010/0042755 A1* | 2/2010 | Fuente et al. | 710/22 |
| 2010/0088468 A1 | 4/2010 | Agombar et al. | |
| 2010/0218038 A1* | 8/2010 | Ikeuchi et al. | 714/6 |
| 2010/0250882 A1 | 9/2010 | Hutchison et al. | |
| 2010/0318757 A1 | 12/2010 | Beeken et al. | |
| 2011/0208932 A1 | 8/2011 | Agombar et al. | |
| 2013/0073519 A1* | 3/2013 | Lewis et al. | 707/610 |

OTHER PUBLICATIONS

IBM Corp.; FlashCopy Mappings; retrieved from http://publib.boulder.ibm.com/infocenter/storwize/ic/topic/com.ibm.storw . . . ; Sep. 8, 2011.

Wikipedia; Inode; retrieved from en.wikipedia.org/w/index.php?title=Inode&oldid=494679136; May 22, 2012.

U.S. Appl. No. 13/532,687, filed Jun. 25, 2012, John P. Agombar et al.

Rumney, Dan; Visualizing IBM SAN Volume Controller FlashCopy Mappings; retrieved from www.danrumney.co.uk/papers/visualfcms/visualisefcms.pdf; Jan. 22, 2009.

\* cited by examiner

SOURCE CLEANING CASCADED VOLUMES USING REFERENCE COUNTS

BACKGROUND

The present invention relates to managing computer data, and more specifically to cleaning cascaded volumes.

It is common for a storage system to have a disk backed up in the case of loss due to hardware malfunction and/or natural disaster. A backup disk may be created by various techniques. For example, a backup disk may be made using snapshot or cloning techniques.

A snapshot is a point-in-time copy that is dependent on the primary disk. A snapshot may, for example, be accomplished using a copy-on-write procedure, in which currently existing data in a region on the primary disk is written to the backup disk when a write is being made to the region on the primary disk. Thus, the backup disk will contain data that has been overwritten on the primary disk, as opposed to a complete copy of the primary disk. This type of backup copy typically results in a thinly provisioned volume, which reduces storage. A series of snapshot copies may be cascaded together to represent the primary disk at various times. However, the snapshot copies typically remain dependent on the primary disk to reassemble a complete copy of the primary disk.

A clone is a point-in-time copy that is independent of the primary disk. A clone may, for instance, be created by executing a background copy procedure in which a disk's regions are sequentially copied to the backup disk and executing a copy-on-write procedure to immediately copy any primary disk regions that are about to be overwritten due to a write and have not yet been processed by the background copy procedure. A clone is typically used when a copy is needed and input/output (IO) to the copy must not impact IO to the primary volume in any way. A clone may also be used when the copy is not to be affected by availability to the source. A clone may also be used in a cascade.

BRIEF SUMMARY

In one implementation, a process for source cleaning cascaded volumes may include storing a primary volume and a number of cascaded backup volumes for the primary volume, receiving writes for at least one of the volumes from an external source, and preparing the writes for storage. The process may also include determining whether a write is for a volume region that is a canonical source and, if the write is for a region that is not a canonical source, decrementing a reference count in a metadata set associated with the region, determining a metadata set location identifier, establishing the volume of the region as a canonical source for a metadata set associated with the metadata set location identifier, and establishing a reference count for the metadata set to indicate that the metadata set is referred to by one volume region. The process may further include examining, if the write is for a region that is a canonical source, a metadata set associated with the region to determine whether another volume depends on data in the region and writing the new data to the region if another volume does not depend on data in the region.

The details and features of various implementations will be conveyed by the following description, along with the drawings.

DETAILED DESCRIPTION

Figure 1:
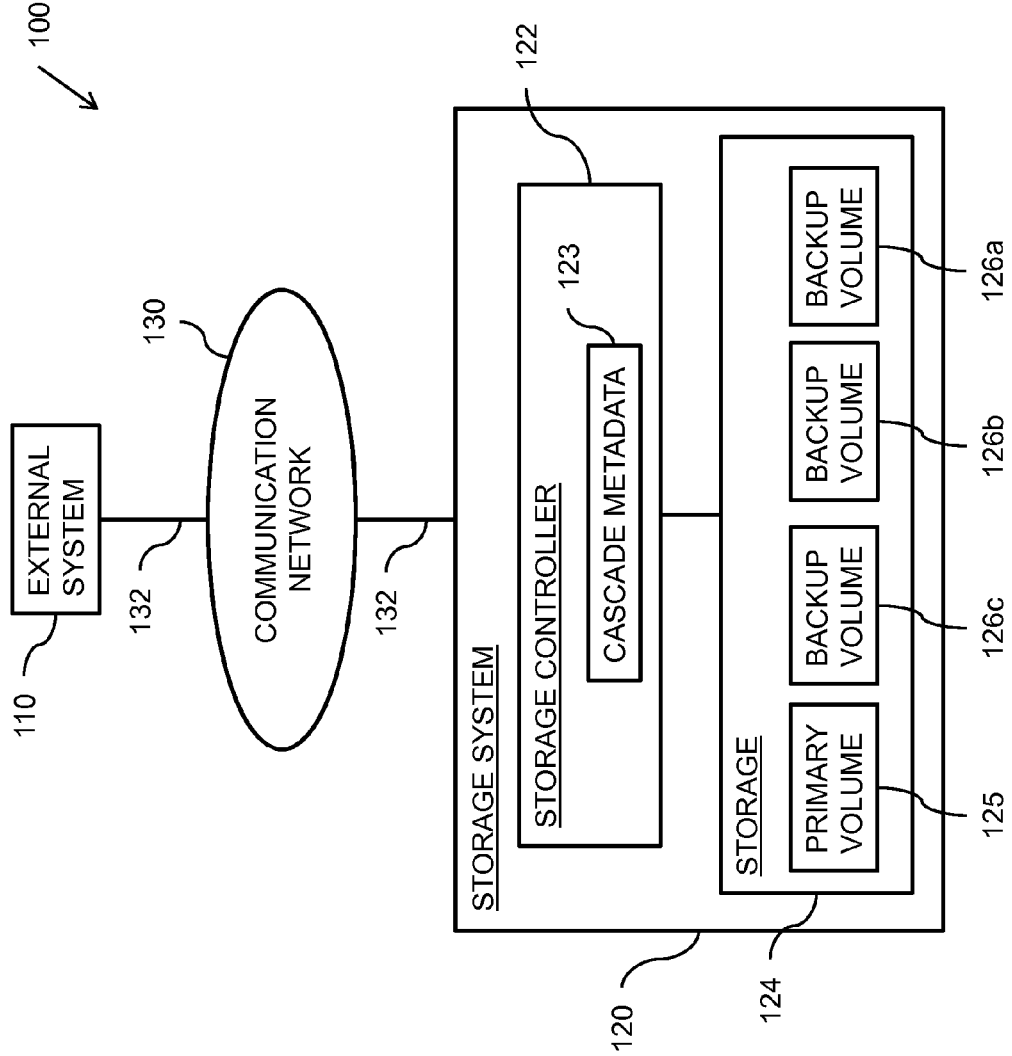
FIG. 1 is a block diagram illustrating an example system for source cleaning cascaded volumes.

Source cleaning cascaded volumes may be achieved by various techniques. In particular implementations, the cascaded volumes may include a primary volume and a number of cascaded backup volumes. Source cleaning of the cascaded volumes may include determining tracking establishing and tracking dependencies between the volumes. The dependencies may, for example, be logged in metadata sets on a per volume region basis. Tracking the dependencies may reduce the number of intervolume copies as it may be determined whether there are sources for data that is about to overwritten and, if there are, any dependencies may be remapped. When one of the volumes needs to be cleaned (e.g., because it is being removed or restarted), the cascade metadata may be analyzed to determine which data on the volume to be cleaned needs to be moved to another volume to maintain the data integrity of the remaining volume.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

FIG. 1 illustrates an example system 100 for source cleaning cascaded volumes. System 100 includes an external system 110, a storage system 120, and a communication network 130.

External system 110 may generally be any computer system that has some of its data stored by generating writes to storage system 120. External system 110 may, for example, be a server system generating data that needs to be stored. Example server systems include Web servers. If the external system is a server system, the server system may include one or more servers, which may be co-located or distributed.

Storage system 120 may store data for various external systems (e.g., server systems running Advanced Interactive eXecutive (AIX) or Windows), which may be local or remote from the storage system. In particular implementations, storage system 120 may provide the primary storage for the example system while other storage systems (not illustrated) provide disaster recovery storage (e.g., by synchronous or asynchronous replication). Storage system 120 may, for example, include storage area networks, raid arrays, hard drives, tape drives, or any other device for storing data. Storage system 120 may, for instance, store data in a block array format.

Storage system 120 includes a storage controller 122 and storage 124 (e.g., a hard disk, a tape, etc.). Storage controller 122 is responsible for placing data in storage 124. For the sake of discussion, storage 124 includes a primary volume 125 and backup volumes 126 for the primary volume. However, storage 124 may typically be configured to include any number of volumes. Volumes 125-126 may, for example, be actual physical devices in storage 124 (e.g., hard drives), portions of physical devices, or representations of physical devices. Storage 124 may also have a number of other volumes that it is storing.

External system 110 and storage system 120 are communicatively coupled to each other through communication network 130. Communication network 130 may, for example, be a local area network (LAN), a wide area network (WAN), or the Internet. External system 110 and storage system 120 are coupled to communication network 130 through communication links 132, which may include one or more wireline (e.g., cable or fiber optic) and/or wireless links (e.g., radio frequency).

Backup volumes 126 may provide backup of primary volume 125 by various techniques. For example, backups may be made using snapshot and/or cloning techniques. As mentioned previously, a snapshot may be a point-in-time copy in which currently existing data in a region on a primary volume is written to a backup volume when a write is being made to the region on the primary volume. Thus, the backup volume will contain data that has been overwritten on the primary volume, as opposed to a complete copy of the primary volume, and will generally remain dependent on some of the data on the primary volume (e.g., the data that has not been changed) in order to present the copy. A region may, for example, be a sector or other addressable portion of a volume. In particular implementations, a region may be approximately 64 KB in size.

This type of backup copy typically results in a thinly provisioned volume, which reduces storage, and may be useful in the event of data corruption on the primary volume. Often, there are many snapshots of a single source existing concurrently, so their reduced size is beneficial. A snapshot may exist in a cascade of volumes for a considerable amount of time (e.g., months or years), but is typically only kept for hours or days.

A clone copy is a point-in-time copy in which the backup volume should end up holding a complete copy of the data that was on the primary volume when the copy was started. A clone copy may, for example, be created by executing a background copy procedure in which a primary volume's regions are sequentially copied and executing a copy-on-write procedure to immediately copy any volume regions that are about to be overwritten due to a write and have not yet been processed by the background copy procedure. A clone copy is typically used when a copy is needed and input/output (IO) to the copy must not impact IO to the primary volume in any way. A clone copy may also be used when the copy is not to be affected by availability to the source. That is, a clone copy may be removed from the cascade and still function properly. For example, a clone copy may be used to take a database to another site. A clone copy is often copied to tape once it is complete.

Backup volumes 126 may provide backup for primary volume 125 by being cascaded with each other. In a cascade, the backup volumes may store multiple point-in-time copies of a single data source. This approach works such that when a new backup volume is started, an existing backup volume using the primary volume as its source volume is modified to use the target volume of the new backup as its source volume.

For example, for the illustrated implementation, suppose that it is desired to take a point-in-time copy of primary volume 125 at times T1, T2 and T3. At time T1, a point-in-time copy using target backup volume 126a may be used, resulting in a cascade of primary volume 125->backup volume 126a (hereinafter denoted as PV->BVa). Then, at time T2, a point-in-time copy using backup volume 126b may be used, resulting in a cascade of PV->BVb->BVa. This arrangement works because if data has been changed on backup volume 126a or primary volume 125 between T1 and T2, the data will be on backup volume 126a, and if the data has not been changed, then both the backup volume 126a and backup volume 126b can read the same data. Similarly, at T3, a point-in-time copy using backup volume 126c may be started, resulting in a cascade of PV->BVc->BVb->BVa. Storage controllers such as SAN Volume Controller FlashCopy from International Business Machines of Armonk, N.Y. may use a cascading implementation to augment source volumes with backup volumes.

Assuming backup volume 126a operates by a snapshot technique, backup volume 126a provides backup by storing the changes to primary volume 125 since the backup began at T1. In this two element cascade, primary volume 125 is the source, and backup volume 126a is the target. Primary volume 125 may therefore be referred to as the effective source of the PV->BVa map.

As mentioned previously, this backup may be accomplished by using copy-on-write. Thus, a write to primary volume 125 may involve copying the data in the region to be written to on primary volume 125 to backup volume 126a and then writing the new data to the copied region of primary volume 125. Thus, the data that was on primary volume 125 when the backup to backup volume 126a became active at T1 will be stored on primary volume 125 (i.e., for the volume regions that have not been written to) and on backup volume 126a (i.e., for the regions that have been written to).

If a read needs to be performed on backup volume 126a (e.g., to determine data on primary volume 125 at T1), the read may proceed by first attempting to locate the data backup volume 126a. If the data is not on that volume (i.e., because it was never overwritten on primary volume 125), the data may be read from primary volume 125.

Primary volume 125 may on occasion need to be restored to its state at T1. For example, this may occur due to a data corruption. The data that has been overwritten on primary volume 125 since backup volume 126a became active may be retrieved from backup volume 126a to restore primary volume 125 to its state at T1.

At a later point in time, T2, the backup to backup volume 126b may become active and store a representation of primary volume 125 beginning at T2. At this point, it is no longer necessary to update backup volume 126a as backup volume 126b will contain the data of primary volume 125 at T2. Thus, the backup chain becomes primary volume 125->backup volume 126b->backup volume 126a (or PV->BVb->BVa). And now the map for primary volume 125->backup volume 126a has source backup volume 126b as the effective source. This transformation is valid because backup volume 126b is an exact copy of primary volume 125 at this point in time (at least for the data regions that it stores).

Backup volume 126b may operate by snapshot or cloning techniques. If it operates by a snapshot technique, writes to primary volume 125 may be treated as they were for the PV->BVa cascade, except that the data being overwritten on primary volume 125 will be placed on backup volume 126b. If backup volume 126b operates by a cloning technique, regions of primary volume 125 will be written to backup volume 126b by a combination of sequential reading, which may take a relatively long period of time, and on-demand writes (e.g., due to data being overwritten by writes to primary volume 125).

In order to maintain the data for this cascade, an IO algorithm may be used. For example, for reads: 1) if a read of backup volume 126a is requested, read backup volume 126a if the requested data is on that volume (e.g., according to region), else read backup volume 126b if the requested data is on that volume, else read primary volume 125; 2) if a read of backup volume 126b is requested, read that volume if the requested data is on that volume, else read primary volume 125; and 3) if a read of primary volume 125 is requested, read that volume.

For writes: 1) if a write to backup volume 126a is requested, write to that volume; 2) if a write to backup volume 126b is requested: a) if backup volume 126a needs data held on primary volume 125 (e.g., because the data on primary volume 125 and backup volume 126 are the same for the written-to region), then read the primary volume, write the result to backup volume 126a, and write the new data to backup volume 126b; b) else if backup volume 126a needs data held on backup volume 126b, then read backup volume 126b, write the result to backup volume 126a, and write the new data to backup volume 126b; or c) else write to backup volume 126b; and 3) if a write to primary volume 125 is requested: a) if backup volume 126b needs the data held on primary volume 125, read primary volume 125, write the result to backup volume 126b, and then write the new data to primary volume 125; and b) else write to primary volume 125.

This IO algorithm allows multiple targets (e.g., two or more) to be cascaded. Moreover, a write to primary volume 125 results in at most one extra write to a backup volume irrespective of the number of backup volumes for primary volume 125. Thus, the impact of the backup maps on the source/production IO performance is relatively small and also bounded.

At some point after T2, backup volume 126a is typically dependent on backup volume 126b. For example, if a data region was not transferred to backup volume 126a between T1 and T2 (e.g., because there was no write to primary volume 125 during that time) but was transferred to backup volume 126b after T2 (e.g., because there was a write to primary volume 125 after T2), backup volume 126a would need this data to restore primary volume 125 to its state at T1.

If backup volume 126b is to be removed from the cascade after this point without affecting backup volume 126a, backup volume 126b should be cleaned. That is, the data on backup volume 127 that is needed for reads (e.g., from an external system) to backup volume 126a must first be copied to backup volume 126a. This process can take a relatively long time. Moreover, if backup volume 126b was constructed by a clone technique, which may have resulted in backup volume 126b becoming fully allocated, and backup volume 126a was constructed by a snapshot technique, the cleaning operation may determine that most of backup volume 126b needs to be transferred to backup volume 126a, which can dramatically increase the amount of data being stored on backup volume 126a, especially if it becomes fully allocated.

At a later point in time, T3, the backup to backup volume 126c may become active and store a representation of primary volume 125 beginning at T3. At this point, it is no longer necessary to update backup volume 126b as backup volume 126c will contain the data of primary volume 125 at T3. Thus, the backup chain becomes primary volume 125->backup volume 126c->backup volume 126b->backup volume 126a (hereinafter also denoted as PV->BVc->BVb->BVa). And now the map for PV>BVb->BVa has source backup volume 126c as the effective source. This transformation is valid because backup volume 126c is an exact copy of primary volume 125 at this point in time (at least for the data regions that it stores).

Backup volume 126c may operate by snapshot or cloning techniques. If it operates by a snapshot technique, writes to primary volume 125 may be treated as they were for the PV->BVb->BVa cascade, except that the data being overwritten on primary volume 125 will be placed on backup volume 126c. If backup volume 126c operates by a cloning technique, regions of primary volume 125 will be written to backup volume 126c by a combination of sequential reading, which may take a relatively long period of time, and on-demand writes (e.g., due to data being overwritten by writes to primary volume 125).

In order to maintain the data for this cascade, an IO algorithm may be used. For example, for reads: 1) if a read of backup volume 126a is requested, read backup volume 126a if the requested data is on that volume (e.g., according to region), else read backup volume 126b if the requested data is on that volume, else read backup volume 126c if the request data is on that volume, else read primary volume 125; 2) if a read of backup volume 126b is requested, read that volume if the requested data is on that volume, read backup volume 126c if the request data is on that volume, else read primary volume 125; 3) if a read of backup volume 126c is requested, read that volume if the requested data is on that volume, else read primary volume 125; and 4) if a read of primary volume 125 is requested, read that volume.

For writes: 1) if a write to backup volume 126a is requested, write to that volume; 2) if a write to backup volume 126b is requested: a) if backup volume 126a needs data held on primary volume 125, meaning that the written-to region is the same for primary volume 125 and backup volumes 126, then read the primary volume, write the result to backup volume 126a, and write the new data to backup volume 126b; b) else if backup volume 126a needs data held on backup volume 126c, meaning that the written-to region is the same for backup volumes 126, then read backup volume 126c, write the result to backup volume 126a, and write the new data to backup volume 126b; c) else if backup volume 126a needs data held on backup volume 126b, then read backup volume 126b, write the result to backup volume 126a, and write the new data to backup volume 126b; or d) else write to backup volume 126b; 3) if a write to backup volume 126c is requested: a) if backup volume 126b needs data held on primary volume 125, meaning that the written-to region is the same for primary volume 125 and backup volumes 126b-c, then read primary volume 125, write the result to backup volume 126b, and write the new data to backup volume 126c (if backup volume 126a needs data held on primary volume 125, then there must be an unbroken cascade of dependencies from backup volume 126a to primary volume 125, meaning the written-to region was the same for all the volumes and backup volume 126b would depend on the region too); b) else if backup volume 126b needs data held on backup volume 126c, then read backup volume 126c, write the result to backup volume 126b, and write the new data to backup volume 126c (if backup volume 126a needs data held on backup volume 126c, then there must be an unbroken cascade of dependencies from backup volume 126a to backup volume 126c, meaning the written-to region was the same for the backup volumes 126 and backup volume 126b would depend on the region too); or c) else write to backup volume 126c; or 4) if a write to primary volume 125 is requested: a) if backup volume 126c needs the data held on primary volume 125, read primary volume 125, write the result to backup volume 126c, and then write the new data to primary volume 125; and b) else write to primary volume 125.

This IO algorithm allows multiple targets (e.g., three or more) to be cascaded. Moreover, a write to primary volume 125 results in at most one extra write to a backup volume irrespective of the number of backup volumes for primary volume 125. Thus, the impact of the backup maps on the source/production IO performance is relatively small and also bounded.

At some point after T3, backup volume 126b is typically dependent on backup volume 126c. For example, if a data region was not transferred to backup volume 126b between T2 and T3 (e.g., because there was no write to primary volume 125 during that time) but was transferred to backup volume 126c after T3 (e.g., because there was a write to primary volume 125 after T3), backup volume 126b would need this data to restore primary volume 125 to its state at T2.

If backup volume 126c is to be removed from the cascade after this point without affecting backup volume 126b, backup volume 126c should be cleaned. That is, the data on backup volume 126c that is needed for reads (e.g., from an external system) to backup volume 126b must first be copied to backup volume 126b. This process can take a relatively long time. Moreover, if backup volume 126c was constructed by a clone technique, which may have resulted in backup volume 126c becoming fully allocated, and backup volume 126b was constructed by a snapshot technique, the cleaning operation may determine that most of backup volume 126c needs to be transferred to backup volume 126b, which can dramatically increase the amount of data being stored on backup volume 126b, especially if it becomes fully allocated.

In certain modes of operation, the regions of data on the volumes may be classified to determine if the data stored in the regions must be cleaned or whether the data is still accessible (e.g., on primary volume 125) to the dependent volume (e.g., backup volume 126a) even when an intervening volume (e.g., backup volume 126b) is removed.

Storage controller 122 includes cascade metadata 123 that may store data regarding the regions on volumes 125-126. In particular, cascade metadata 123 may define whether a region's data is a source for other regions on other volumes or dependent on other regions of other volumes.

Looking further at the PV->BVc->BVb->BVa cascade described above, consider what happens to the targets when they are written to. For this example, assume that backup volumes 126 are thinly provisioned (e.g., storage is only allocated for regions that have been written to) because that illustrates several issues well. Primary volume 125 is assumed to be fully provisioned, as this is the most common configuration.

If a region is written to on primary volume 125, the write causes no space to be allocated on the primary volume, but it requires the same region to be allocated on backup volume 126c as the copy-on-write procedure moves the existing data from primary volume 125 to backup volume 126c in the cascade. A write to a region on backup volume 126c causes that region to be allocated on backup volume 126c (for the new write) and also on backup volume 126b for the existing data on primary volume 125 that backup volume 126c used to depend on and backup volume 126b still depends on. Likewise, a write to a region on backup volume 126b causes that region to be allocated on backup volume 126b and backup volume 126a. A write to a region on backup volume 126a only causes that region on backup volume 126a to be allocated.

At a later point in time, one of the backup volumes may need to be removed from the cascade. For example, the storage of a backup volume may be needed to be used for a different purpose (e.g., a point-in-time copy may need to be refreshed with a later copy).

For example, if backup volume 126b needs to be removed from the cascade at a later time, the regions that backup volume 126a depends on from backup volume 126b should be copied to backup volume 126a before backup volume 126b is removed from the cascade and used for a different purpose. Following the removal of backup volume 126b, regions will have been allocated on backup volume 126a from any writes to backup volumes 126a-c, regardless of whether there is an already-allocated region earlier in the cascade that contains the data needed for backup volume 126a. This additional allocation requirement tends to have significant cost, with extra physical storage required, along with extra system management, and the physical space, electricity and cooling costs that come with it. It also means that the storage is being accessed more often than it needs to, copying the data down the cascade unnecessarily. This increased in-storage access may lower the performance of the system significantly as every copy needed to update a volume further down the cascade with data it depends on will turn a single write into a read and two writes, potentially decreasing the total number of writes per second that the storage system will support to one-third that which it would support on a volume that was not requiring such a copy.

If backup copies 126a-c were fully provisioned, instead of thinly provisioned, the additional copying of the data will only generate the performance impact, not the storage impact, as the entire volume is already allocated.

Storage system 120 may use cascade metadata 123 for the volume 125-126 to overcome these issues. In particular, cascade metadata 123 may be a set of location details regarding the data stored on the volumes in the cascade and the volume regions that rely on that data. The metadata may be available across storage system 120.

Cascade metadata 123 may include sets of data such that each set includes an identifier for a volume, an identifier for a region within the volume, and a reference count for the data stored in the region of the volume. Each set may be addressed through a unique identifier. In certain implementations, for example, the unique identifier may be a number, which could be 64 bits in length, or larger, to avoid reuse issues. The metadata may be stored as an array, a linked list, a hash table, a tree, or any other method that allows the system to locate a data set from the unique identifier. Each set may refer to a region of storage being point-in-time copied by the storage system, and thus, there may be enough of these entities to satisfy the requirements for the amount of storage that may be point-in-time copied.

Beginning with a single volume, PV, such as primary volume 125, which may be an ordinary volume (e.g., an array of logical blocks), when the volume is created in a storage system, an additional set of metadata, which will hereafter be referred to as a volume catalog, is allocated that is large enough to store one of the unique identifiers for each region of the volume. For each region of the volume, the volume catalog can be allocated a metadata set. Any common method may be used to support this, such as maintaining a list of the free, or currently unused, metadata sets. The metadata set allocated for a region may store that region's volume identifier, the region's location in the volume, and the reference count for the data in that region, which would be set to one at this point as it is being used once. The unique identifier for the metadata set for that region's entry may be stored in the volume catalog.

Thus, to determine the location of the metadata set for a given region on the primary volume, the region's entry in the volume catalog may be found, which provides the unique identifier with which to look up the appropriate metadata set, which in turn gives the volume identifier and location within the volume. Of course, with a single standalone volume, this will typically refer back to the same region on the primary volume. Thus, for a single volume not involved in a point-in-time copy, setting up this metadata could be deferred until the volume is involved in a point-in-time copy for the first time.

Figure 2:
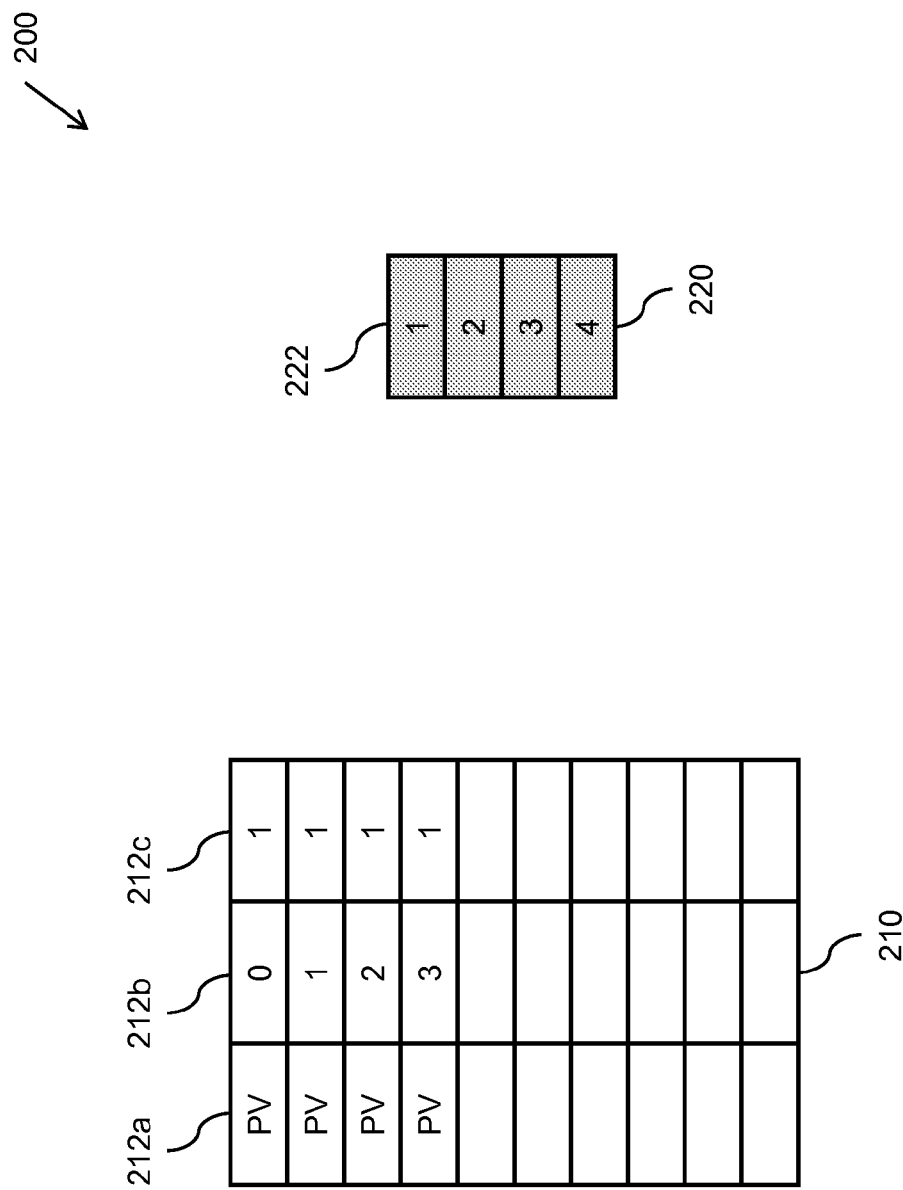
FIG. 2 is a line drawing illustrating example cascade metadata for source cleaning cascaded volumes.

FIG. 2 illustrates example cascade metadata 200 for a single volume, such as primary volume 125. As illustrated, metadata 200 includes metadata sets 210 and a volume catalog 220.

Metadata sets 210 are illustrated in a tabular form that includes three columns 212. Column 212a includes a volume identifier, column 212b includes a volume location (e.g., a region number), and column 212c includes a reference count for the region data. Thus, each row of the table forms a tuple for a volume region and may be uniquely addressed (e.g., through the use of a row number).

Volume catalog 220 is also illustrated in a tabular form, which includes a single column 222. Column 222 contains location identifiers for metadata sets 210. That is, each identifier in volume catalog 220 identifies a particular metadata set 210. To simplify the illustration, each identifier in volume catalog 220 is an integer that directly corresponds to a metadata set 210. Other identification schemes may also be used. Additionally, each entry in volume catalog 220 directly corresponds to a region on the volume. In this example, the first entry corresponds to region zero, the second entry corresponds to region one, the third entry corresponds to region two, and the fourth entry corresponds to region three. In other implementations, associations other than direct ones may be used in a volume catalog.

When the first copy is taken from the primary volume PV onto the first backup volume BVa, such as backup volume 126a, a volume catalog is also allocated for the backup volume. Each entry in the backup volume's catalog is initialized to the same value as that in the matching entry in the primary volume's catalog, and the reference count for that region in the associated metadata set is incremented. In this case, the reference count will increase to two, as there are now two regions that rely on the underlying data. Determining the location of a region of the backup volume will occur as described previously for the primary volume, which will currently refer to the matching region on the primary volume.

Figure 3:
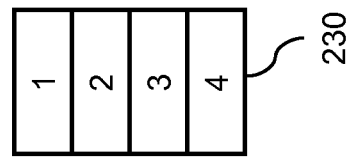
FIG. 3 is a line drawing illustrating example cascade metadata for source cleaning cascaded volumes.
Figure 3:
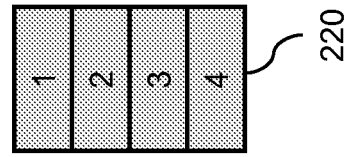
Figure 3:
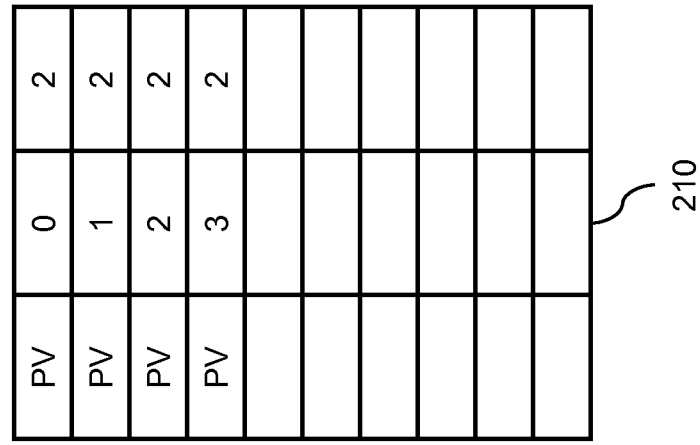

FIG. 3 illustrates an example set of cascade metadata 300 for a primary volume, such as primary volume 125, and a first backup volume, such as backup volume 126a. As illustrated, metadata 300 includes metadata sets 210, primary volume catalog 220, and a first backup volume catalog 230. As just mentioned, first backup volume catalog 230 has been added due to the first backup volume, and its regions, represented here by rows, are mapped to the same metadata sets as the primary volume's regions. Furthermore, the reference counts in column 212c have been updated to reflect the activation of the backup volume.

When a region is written to on the primary volume or the first backup volume, the storage system checks the reference count in the metadata set referred to by the volume catalog entry for that region. As the copy has just been taken, the reference count is at two, as illustrated in FIG. 3. Because this value is greater than one, it can be determined that the write will affect more than one copy. This may be done differently depending on which volume the write is to be applied to. As the data is actually stored on the primary volume, the primary volume will be referred to as the canonical source for that data. In this disclosure, a canonical source is a volume region that is storing data. Entries in a volume catalog for volume regions that do not store data refer to a canonical source for that data on a different volume. The canonical source can be determined by identifying which volume the metadata set refers to. In the figures, canonical sources are shaded grey in the volume catalogs to facilitate understanding.

If the write is to be applied to a volume that is not the canonical source (e.g., the first backup volume in FIG. 3), it can be determined that the physical storage on the volume for that region is not being used for this or any other volume because the associated metadata set does not refer to the volume being written to. Thus, the write may be made to the volume without copying data to a different volume. The write may then be applied to the volume.

Any merging of the data with the data on the canonical source if the write does not cover an entire region may proceed as normal with a copy-on-write solution. For example, if a write is to a region 128 sectors long but spans sectors 20-49 in the region, sectors 0-19 and 50-127 should be read from the canonical source, merged with sectors 20-49 for the new write, and then all 128 sectors written out. A complete region's worth of data should be created for the volume that's not the canonical volume.

Before completing the write to the external system that sent the write to the storage system, the associated metadata set and the volume catalog must be updated. As the volume will now contain different data on the written to region, the storage system may allocate a new metadata set for it. This new metadata set is initialized with the volume and region the write was applied to. Additionally, the reference count for the metadata set previously referred to by the volume catalog for that region is decremented, the volume catalog for the written-to volume is updated to refer to the newly-allocated metadata set, and the newly-allocated metadata set's reference count is set to one. These three operations may be journalled and replayed if interrupted, or otherwise made atomic, to ensure that the reference counts remain consistent. This results in the just-written region becoming a canonical source.

Figure 4:
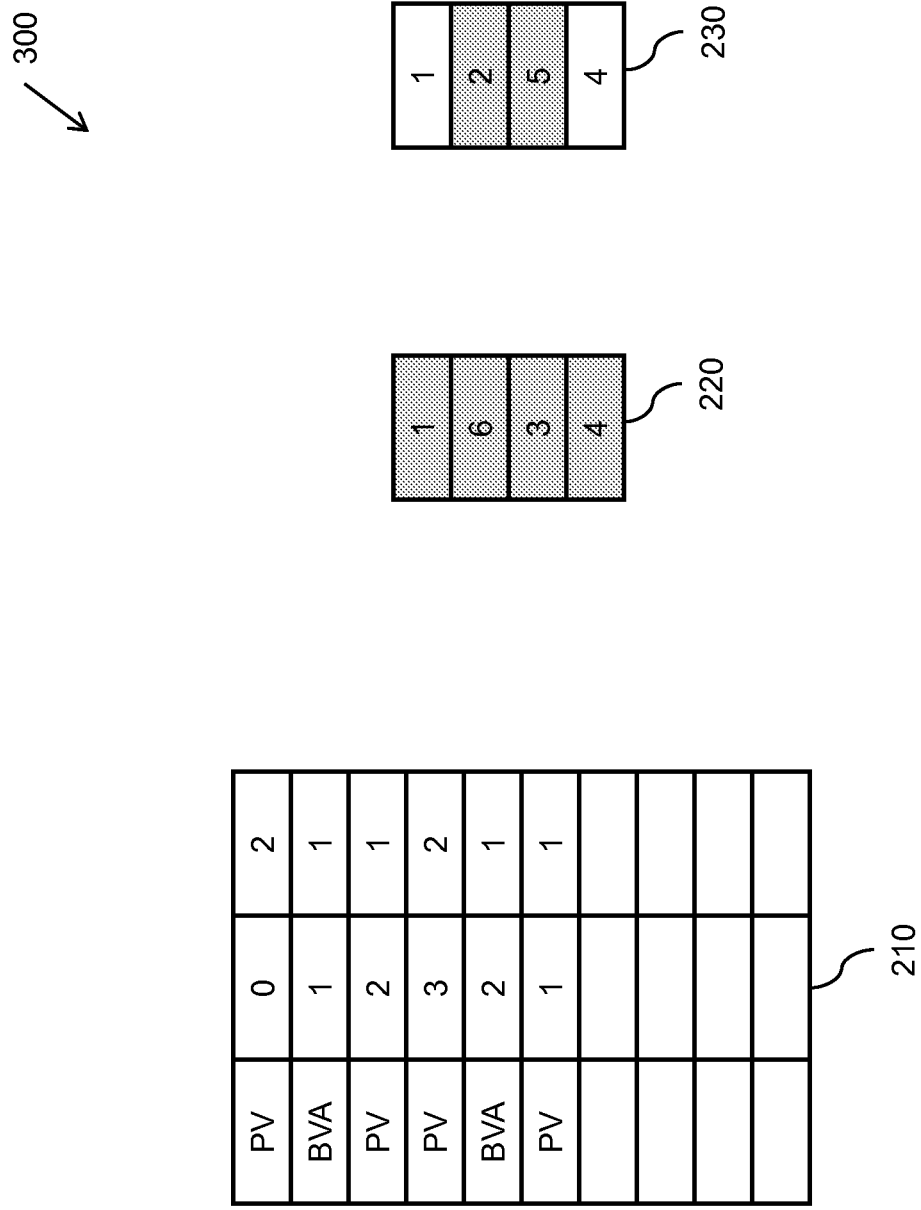
FIG. 4 is a line drawing illustrating example cascade metadata for source cleaning cascaded volumes.

FIG. 4 illustrates how cascade metadata 300 would be updated for this process. In this example, a write was applied to the second region (i.e., region one) of the primary volume and the third region (i.e., region two) of the backup volume, although only the latter will be discussed presently. The write to the third region of the backup volume has resulted in the storage system modifying the metadata set for the third region of the primary volume and generating a metadata set for the third region of the first backup volume. In particular, the metadata table set entry associated with the third region of the primary volume now indicates that the reference count has been decremented to one. Additionally, the third region of the first backup volume has been assigned a new identifier (i.e., 5) in volume catalog 230, and upon inspecting metadata sets 210, it can be seen that the corresponding metadata set (i.e., the fifth one), indicates that the associated volume is the first backup volume, the associated region on the volume is the third one (i.e., region two), and the reference count is one.

If, instead, the write was applied to the canonical source (i.e., the primary volume in the example in FIG. 3), and the reference count is greater than one, the storage system may determine that the data on that region of the primary volume is required by at least one other volume, and the data should be copied to another volume. The storage system may examine the list of volumes in order in the cascade to find the first volume after the canonical source in the cascade that has a reference to the associated metadata set in the matching entry in its volume catalog. In this case, this will be the first backup volume, as it is the only other volume in the cascade. The data for that region is then copied from the canonical source to the backup volume (i.e. the primary volume to the first backup volume), and the metadata set is updated to point to the found backup volume, making it the new canonical source. As the old canonical source is now no longer the canonical source, its data may be changed without any other volumes in the cascade being affected, so operations may continue as described previously. That is, a new volume catalog entry may be allocated for the newly written region.

FIG. 4 also illustrates how cascade metadata 300 would be updated for this process. In this example, a write was also applied to the second region (i.e., region one) of the primary volume. The write to the second region of the primary volume has resulted in the storage system updating the associated metadata set (i.e., the second one) to point to the found backup volume, making it the new canonical source, and allocating a new volume catalog entry for the second region of the primary volume since it is no longer the canonical source, which appears as the sixth metadata set 210.

There may be as many canonical sources for a given region across a cascade as there are different sets of data. For example, if the PV->BVc->BVb->BVa cascade has been modified on the primary volume and the first backup volume, the primary volume, the first backup volume, and the third backup volume will be canonical sources for that region. There is one canonical source for each metadata set.

Figure 5:
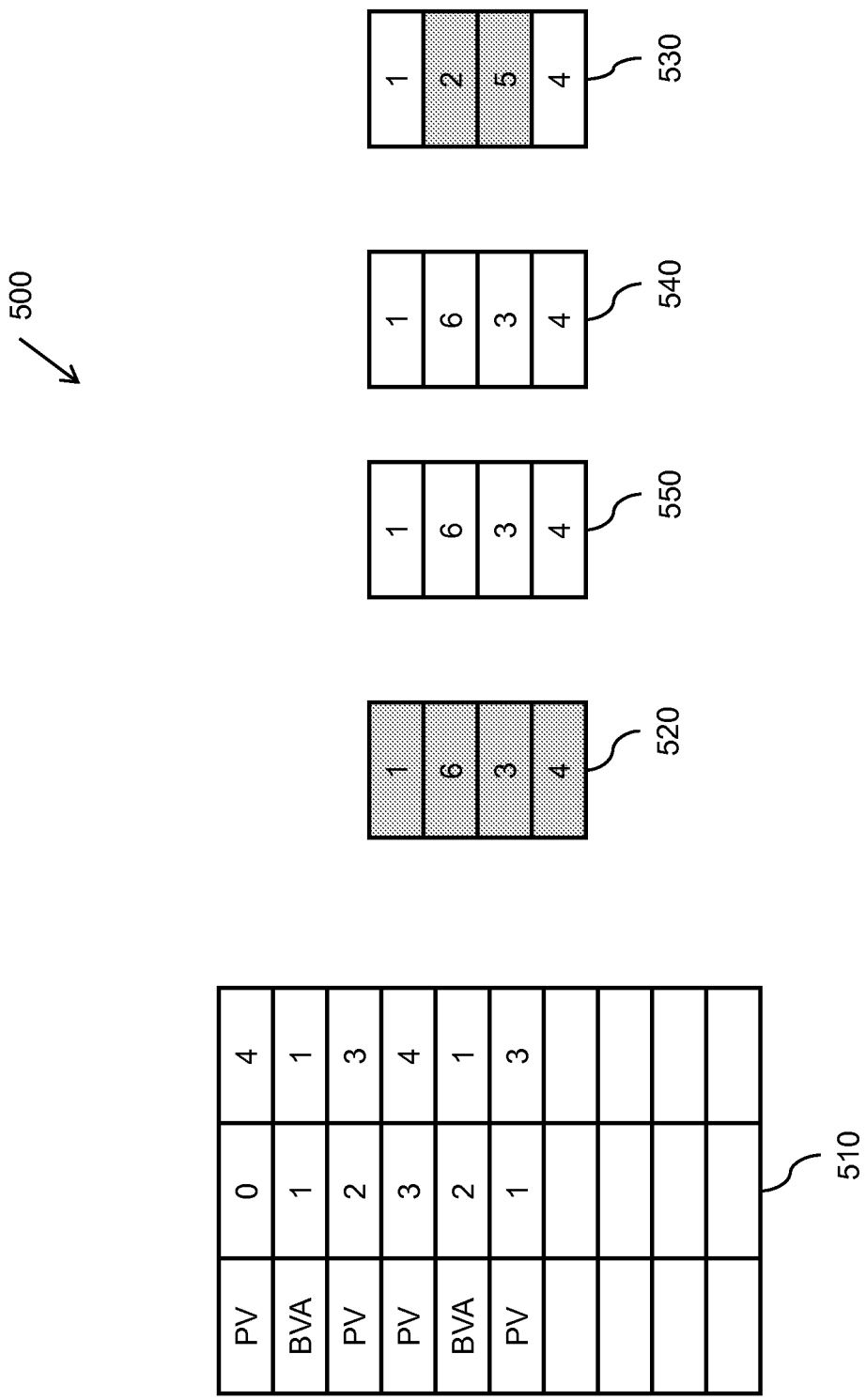
FIG. 5 is a line drawing illustrating example cascade metadata for source cleaning cascaded volumes.

FIG. 5 illustrates example cascade metadata 500 for a primary volume and three backup volumes. In particular, cascade metadata 500 begins with the data as established by cascade metadata 300 in FIG. 4 and then two more backup volumes are added, with their volume catalogs being labeled 540 and 550.

As is typical for cascaded point-in-time copies, the new backup volumes of the primary volume were each inserted in the cascade immediately following the primary volume, to correctly represent the dependencies between the copies. As before, volume catalogs 540, 550 were each initialized with the contents of the primary volume's catalog at the time. In this example, the primary volume did not receive any writes between the time the point-in-time copy from the primary volume to the second backup volume was triggered and the time the point-in-time copy from the primary volume to the third backup volume was triggered. Thus, the volume catalogs 520, 540, 550 are identical. Additionally, the reference counts were adjusted in the table 510 to reflect the fact that additional volumes depend on the data.

Figure 6:
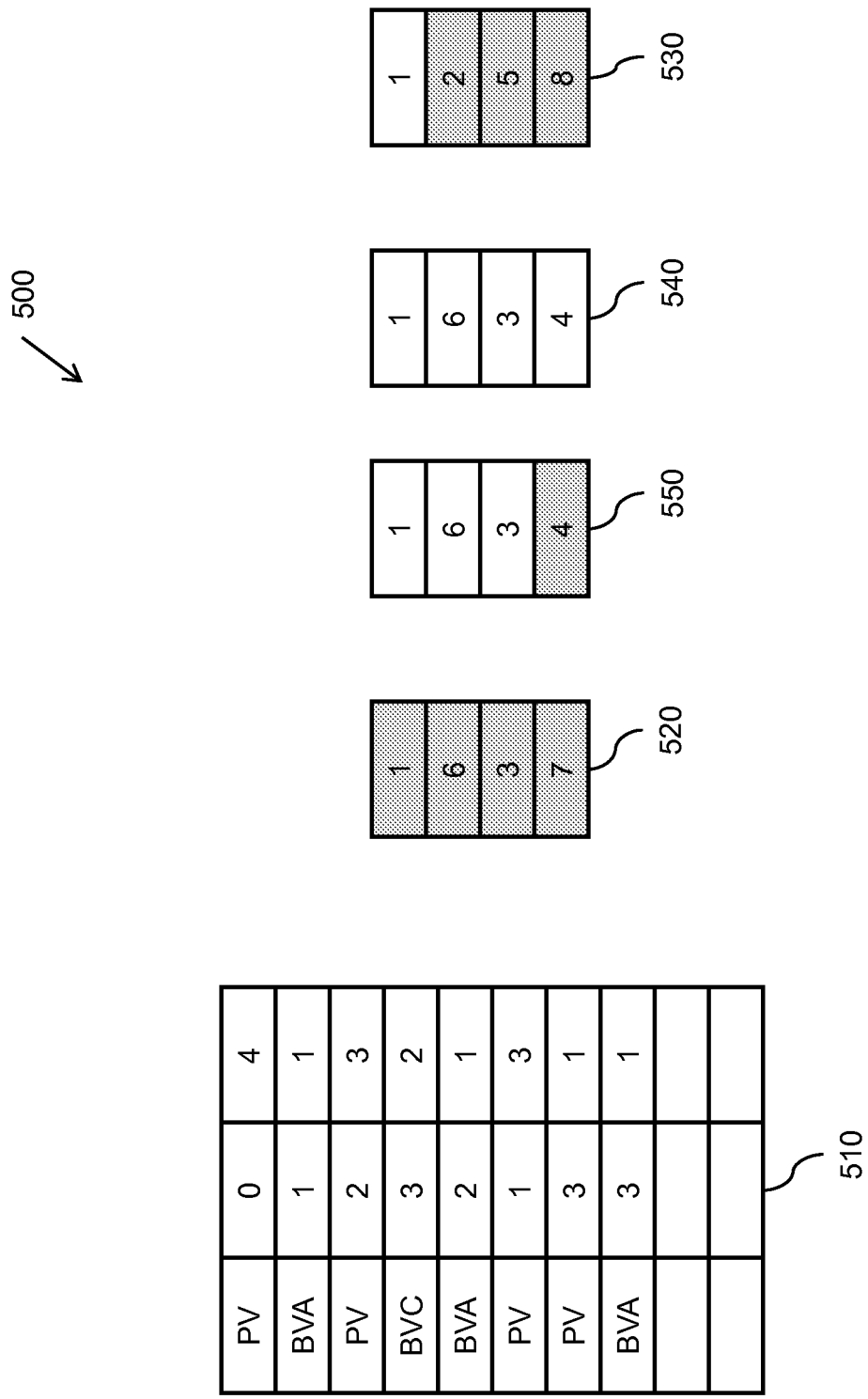
FIG. 6 is a line drawing illustrating example cascade metadata for source cleaning cascaded volumes.

FIG. 6 illustrates cascade metadata 500 when a write has been applied to the fourth region of the primary volume and the fourth region of the first backup volume. The write to the fourth region of the primary volume causes the storage controller to move the data at that region to the third backup volume. Thus, the fourth metadata set 510 has been adjusted to make the volume identifier identify the third backup volume as the canonical source for this data now. Moreover, the reference count for this data has been decreased by one since a volume (i.e., the primary volume) no longer relies on it. Additionally, another metadata set 510 has been created for the data written to the primary volume. This entry appears as the seventh metadata set 510 and indicates that the primary volume is the canonical source for this data, the data is located at the fourth region (i.e., region three) of the primary volume, and only one volume is depending on this data. The fourth entry in the primary volume's catalog 520 was also changed to include an identifier that indicates the seventh metadata set 510. Thus, the new metadata set for the first backup volume can be found from its volume catalog. There is no change in the identifier for the region data on the second backup volume or the third backup volume, so there were no changes made to volume catalogs 540, 550.

The write to the fourth region of the first backup volume causes the data at that region to be overwritten. (There is no copy-on-write, as there is no further volume in the cascade.) Thus, the fourth metadata set 510 has been adjusted to make the reference count for this data decrease by one since a volume (i.e., the first backup volume) no longer relies on it. Additionally, a metadata set was created for the data written to the first backup volume. This entry appears as the eighth metadata set 510 and indicates that the first backup volume is the canonical source for this data, the data is located at the fourth region of the volume (i.e., region three), and only one volume is depending on this data. The fourth entry in the first backup volume's catalog 530 is also changed to include an identifier that indicates the eighth metadata set 510.

If a region is written to for which the associated metadata set's reference count is one, the write can proceed normally, without any changes to the volume catalog or the metadata set, as the data is changing on the only volume referring to this region. This would happen, for example, if the second region (i.e., region one) on the first backup volume was written to in FIG. 6, or any other region with a reference count of one.

As mentioned previously, there is one canonical source for each metadata set. Thus, the canonical source may be determined on a region-by region basis. This can, for example, be seen for the fourth region of the four volume cascade in FIG. 6, which has three canonical sources.

If a volume is deleted (for example, the primary volume or one of the backup volumes need to be deleted to reclaim their storage), for each entry in the associated volume catalog, the reference count is decremented in the associated metadata set. If the reference count reaches zero, the storage system may determine that it is deleting the only volume that needs that data, and, hence, no further action is needed. This would, for example, happen for the fourth region of the primary volume in FIG. 6 if that volume were deleted.

If the count is non-zero, there are two options. If the volume being deleted is not the canonical source, a different volume contains the information that the surviving volume(s) need, and, hence, no further action is needed. This would, for example, happen for the fourth region of the second backup volume if that volume were deleted. If the volume being deleted is the canonical source for that region, the storage system should copy the data to another volume. To accomplish this, the storage system may examine the list of volumes in order in the cascade to find the first volume after the canonical source that currently has a reference to this metadata set in the associated entry in its volume catalog. The data for that region is then copied from the canonical source to the identified volume, and the metadata set is updated to point to the identified volume, making that volume the new canonical source. As the old canonical source is now no longer the canonical source, it may be deleted without any other volume in the cascade being affected. Thus, no further action is needed for that region. This would, for example, happen for the fourth region of the third backup volume if that region were deleted, with the data being moved to the second backup volume and that volume being made the canonical source.

If a copy is not deleted but instead restarted (e.g., to refresh the volume with a more recent copy of the data), this may be considered as a deletion of the copy, and copying of regions for which this copy is the canonical source and the reference count is greater than one may be performed. The copy may then be added to the cascade anew, being reinserted in the cascade immediately after the primary volume and with a volume catalog initialized to the current contents of the primary volume's catalog.

The write process can also provide a type of cleaning For example, assume that a cascade has a primary volume and three backup volumes—PV->BVc->BVb->BVa—and the backup volume all refer to the same metadata set for which the primary volume is the canonical source, giving it a reference count of four. If a write is performed to one of the intermediate volumes (i.e., BVc or BVb), the write to the volume may be performed without having to move data from the primary volume to the volume downstream of the write because the downstream volume still refers back to the primary volume. Thus, this process has performed smart cleaning by avoiding copying data unless the actual data (i.e., that on the primary volume) is overwritten. The existing cascading point-in-time copy implementations typically copy (or "clean") data to the next downstream volume in the cascade if it needed it, even if there is an upstream volume with the required data available.

The example implementations above assume that there is no background copy (e.g., the data in the PV->BVc->BVb->BVa cascade only gets copied when necessary). This is commonly referred to as a snapshot technique, which means that the first backup volume will depend on the second backup volume until the second backup volume is deleted or entirely written to. This behavior is good for limiting the number of IO operations the storage system must perform to support the cascade of volumes, and for thinly-provisioned volumes, it limits the storage requirements. However, some copies may need to have their own copy of the data for resilience or for distributing the IOs of external systems amongst multiple physical storage devices. These copies are commonly referred to as clones.

A background copy process typically run for a clone replicates the data from the source to that clone. Such a process usually starts at one end of the volume and proceeds to the other end. As the process copies each region, the clone is no longer dependent on the source volume for that region.

Assuming that the second backup volume in the PV->BVc->BVb->BVa cascade is a clone, as the background copy process replicates regions from the primary volume to the second backup volume, the second backup volume is no longer dependent on the primary volume for the copied regions. However, with current implementations, the first backup volume is now dependent on the second backup volume for all those copied regions, and if the second backup volume is then deleted, the system has to copy all the regions from the second backup volume to the first backup volume, even though the primary volume may still contain the same data. This means that the first backup volume, which was intended to only record a small set of changes, now has to record a large portion of the volume (perhaps all of the volume, if the background copy process has made enough progress).

The example implementation discussed above may be extended to allow multiple canonical sources of each copy of data. For example, a "next in chain" identifier may be added to each metadata set. Thus, if a region has been background copied, such that the same data exists on more than one volume's physical storage, an additional location detail object may be allocated for the second volume with physical storage, and the next-in-chain identifier of the first volume's metadata set may be set to the identifier for the second volume's metadata set. The second volume's metadata set is initialized with the volume and location of the newly-copied region. However, the reference count is not maintained for the second volume's metadata set as the first volume's reference count includes the copy. Metadata sets that do not have alternate canonical sources, or are the last in a chain of objects that refer to alternate canonical sources, may have the next field set to an invalid value, which may be a well-defined unique identifier that is not used normally. The volume catalog for the newly-copied region continues to refer to the original metadata set, from which the chain of next fields can be followed to find all the alternate canonical sources, including the newly-copied region.

Figure 7:
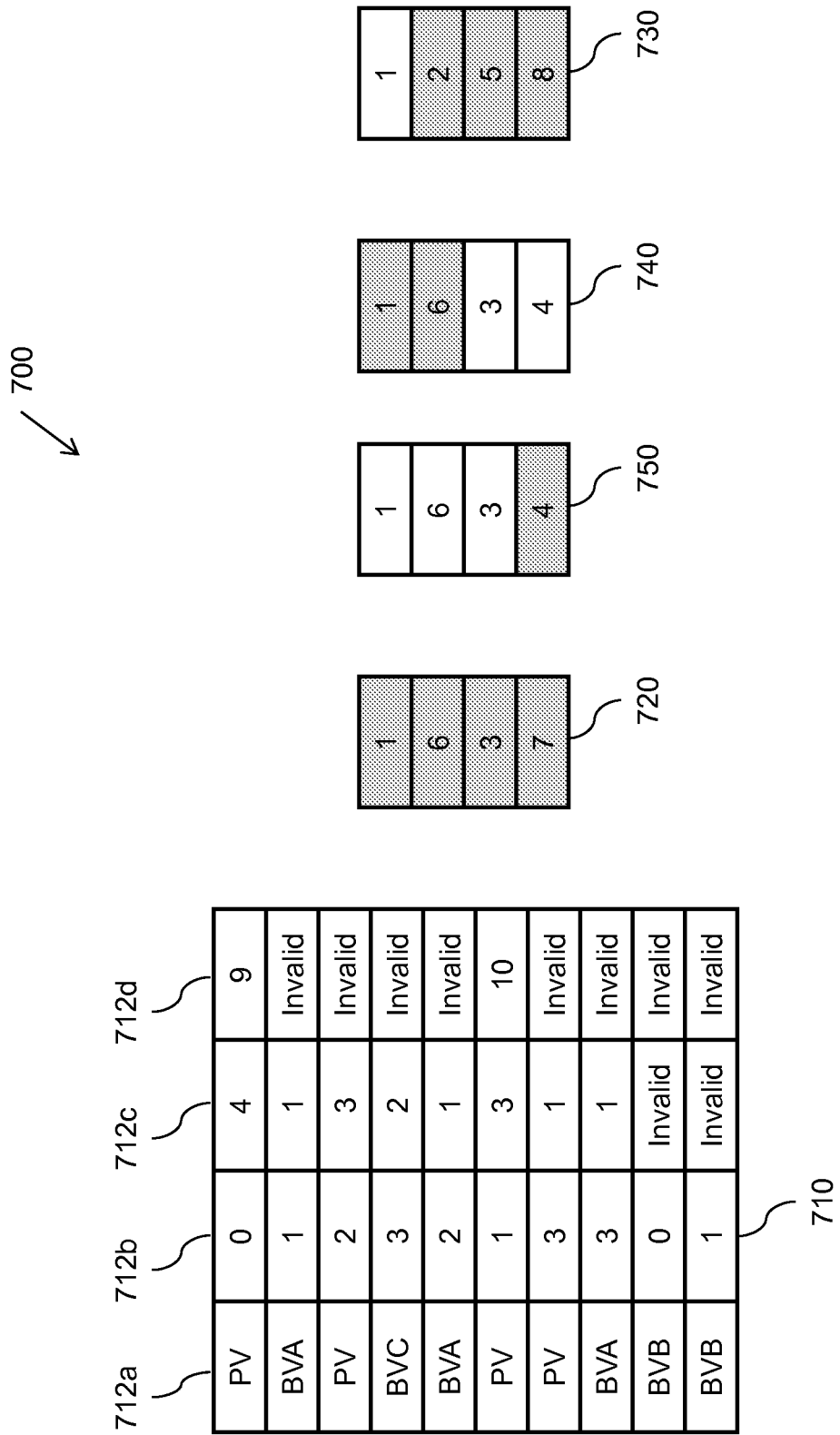
FIG. 7 is a line drawing illustrating example cascade metadata for source cleaning cascaded volumes.

FIG. 7 illustrates example metadata cascade 700 for an extended scenario. The scenario begins with volumes in the configuration shown in FIG. 6. Thus, there is a primary volume, which has an associated volume catalog 720, a first backup volume, which has an associated volume catalog 730, a second backup volume, which has an associated volume catalog 740, and a third backup volume, which has an associated volume catalog 750. Additionally, the original metadata sets have been modified to include a next-in-chain entry, illustrated here as column 712d, which contains a metadata set identifier for a canonical source associated with the canonical source in the metadata set.

Furthermore, the second backup volume is a clone that has background copied the first two regions of the primary volume. Thus, when the first region of the primary volume was copied to the second backup volume, a new entry was created at the second to last metadata set 710. As just discussed, this entry indicates that the first region (i.e., region zero) of the second backup volume serves as a canonical source. Additionally, the original metadata set for the data, which is the first metadata set 710, has been updated to refer to the new entry in the next-in-chain column 712d. No changes were made to the volume catalogs 720-750.

Similarly, when the second region of the primary volume was copied to the second backup volume, a new entry was created as the last metadata set 710. This entry indicates that the second region of the second backup volume serves as a canonical source. Additionally, the original metadata set source for the data, which is the sixth metadata set 710, has been updated to refer to the new entry in next-in-chain field 712d.

Thereafter, the storage system behaves as in the earlier implementation, but with the following differences. When a determination is needed regarding whether a region is a canonical source, the storage system examines the chain of metadata sets that the volume catalog refers to the first entry of. If a canonical source is written to for which there is a canonical source earlier in a chain (e.g., a canonical source that references the written-to canonical source), the storage system does not copy any data on the physical storage. Instead, the storage system removes the identifier for the secondary canonical source from the chain of alternate canonical sources so that it is a separate metadata set, sets the reference count for the data set associated with the alternate canonical source to one, decrements the reference count from the metadata set in the chain that the secondary canonical source was removed from, and updates the volume catalog for the alternate canonical source to point directly to the data set associated with the alternate canonical source.

If a canonical source that is the primary canonical source in a chain (e.g., the one that is referred to by the volume catalogs) is written to, the storage system cannot easily identify the volume catalog entries that refer to the metadata set in question. Thus, the storage system may allocate a new metadata set that is initialized with the volume identifier and volume location that has been written to and a reference count of one and update the volume catalog for the primary canonical source to refer to the new metadata set. The storage system may also update the metadata set at the start of the chain to refer to the volume and location of the second volume in the chain (e.g., a second canonical source), remove the second metadata set from the chain, and decrement the reference count of the metadata set at the start of the chain. By keeping the metadata set referring to data that has not changed, the storage system does not need to update the volume catalogs for unmodified regions. Moreover, the storage system does not have to move data to another volume even though a canonical source is being overwritten.

Figure 8:
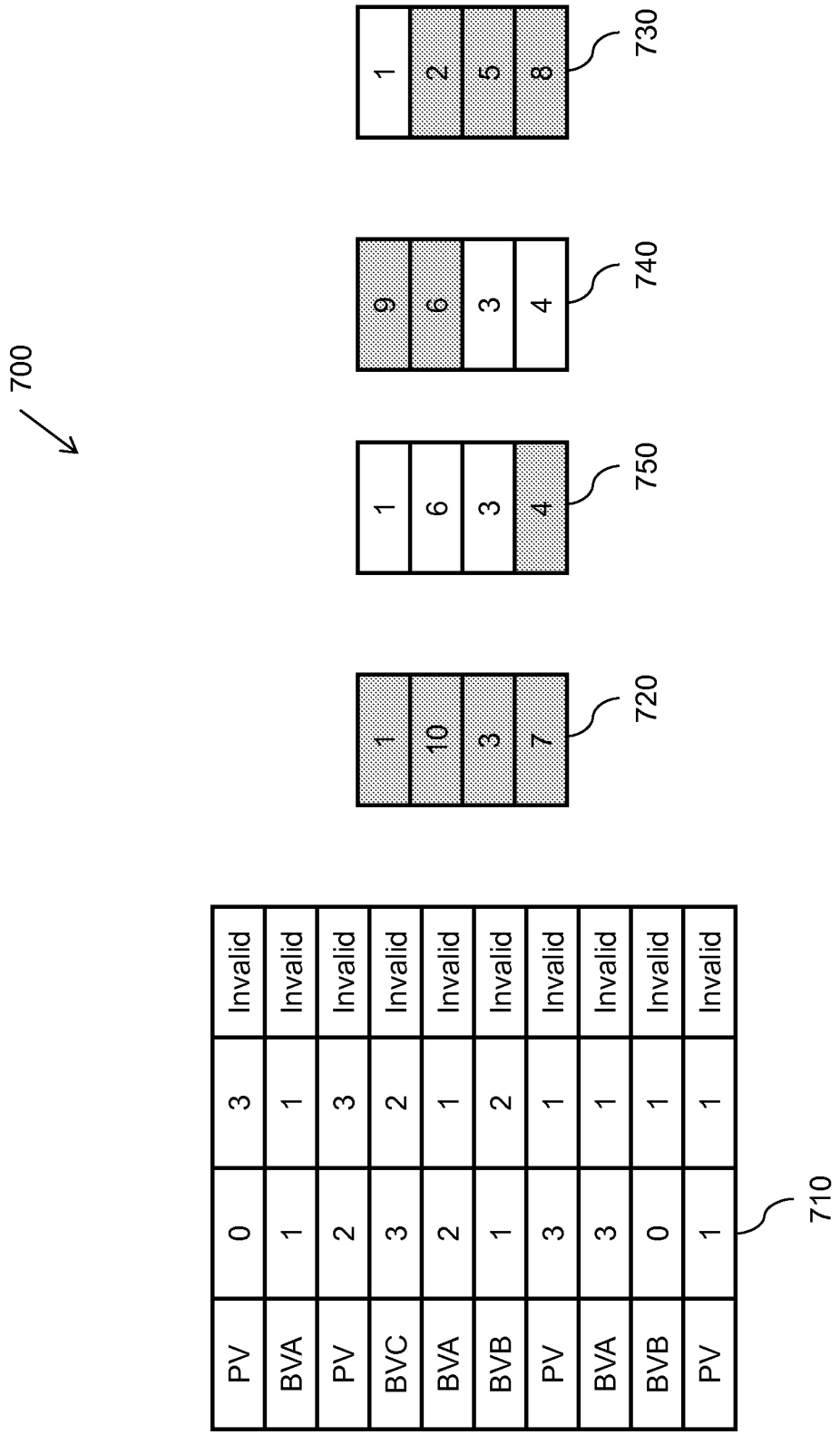
FIG. 8 is a line drawing illustrating example cascade metadata for source cleaning cascaded volumes.

FIG. 8 illustrates metadata model 700 being modified according to this scenario for two writes. The first write is to the first region (i.e., region zero) of the second backup volume, and the second write is to the second region (i.e., region one) of the primary volume.

The first write illustrates a write to a canonical source for which there is a canonical source earlier in the chain. Thus, the storage system does not copy any data on the physical storage. Instead, the storage system removes the association with the secondary canonical source from the chain of alternate canonical sources in the original metadata set so that the chained metadata set is a separate metadata set, sets the reference count for the metadata set associated with the alternate canonical source to one, decrements the reference count from the first entry in the chain that the secondary canonical source was removed from, and updates the volume catalog for the alternate canonical source to point directly to the data set associated with the alternate canonical source.

As the chain is a normal linked list, the normal removal techniques work, where the next value for the object immediately in the chain before that being removed is set to the object being removed's next value, which in turn is set to an invalid value. The new write to the first region of the second backup volume shows this. Moreover, the storage system does not have to move data to another volume even though a canonical source is being overwritten.

The second write illustrates a write to a primary canonical source in a chain. In this case, the storage system allocates a metadata set with the volume identifier and volume location that has been written to and a reference count of one and updates the volume catalog for the primary canonical source to refer to the new metadata set. In this implementation, the storage system has reused the tenth metadata set 710 as this metadata set is no longer needed. The storage system also updates the metadata set at the start of the chain (i.e., the sixth metadata set 710) to refer to the volume and location of the secondary canonical source volume in the chain, removes the second metadata set from the chain, and decrements the reference count of the metadata set at the start of the chain. By keeping the metadata set referring to data that has not changed, the storage system does not need to update the volume catalogs for unmodified regions. Moreover, the storage system does not have to move data to another volume even though a primary canonical source is being overwritten.

If a volume region that has multiple associated canonical sources is deleted, the storage system may behave the same as if the region were written to, except that it does not need to maintain a metadata set for that region. Thus, if a canonical source for which there is a canonical source earlier in the chain is being deleted, the storage system does not copy any data on the physical storage. Instead, the storage system removes the identifier for the secondary canonical source from the chain of secondary canonical sources so that it is a separate metadata set and decrements the reference count from the first entry in the chain that the secondary canonical source was disassociated from. The storage system may also remove the metadata set associated with the volume being cleaned. Moreover, the storage system does not have to move data to another volume even though a canonical source is being deleted.

If a canonical source that is the first canonical source in a chain is being deleted, the storage system may update the metadata set at the start of the chain to refer to the volume and location of the second volume in the chain, remove the second metadata set from the chain, and decrement the reference count of the metadata set at the start of the chain. By keeping the first metadata set in the chain referring to data that has not changed, the storage system does not need to update the volume catalogs for unmodified regions. Moreover, the storage system does not have to move data to another volume even though a canonical source is being deleted.

If there is only one canonical source associated with a metadata set, the storage system may behave as in the case where there are no alternate canonical sources when it is written to or deleted. Thus, it may, among other things, copy the data to the first volume in the cascade that depends on it.

The current implementation has a variety of features. For example, cleaning has been improved by not needing to copy data for dependent volumes unless there are no physical copies of the data on any volume in the cascade. For instance, cleaning when a copy is deleted has been improved by not needing to copy data for dependent volumes unless there are regions that are canonical sources, for which there are no physical copies of the data on any remaining volume in the cascade.

These implementations are equally applicable to true cascades of copies (where a copy is taken of a copy) as to multiple-target copies (where multiple copies are taken of a single source), and likewise to mixtures of the two in any combination. These implementations rely on the underlying cascaded point-in-time copy features, but improve them by no longer requiring that the location of the physical storage for a copy's region lie in that copy or an immediately upstream copy (with no intervening copies containing different data for that region).

Figure 9A:
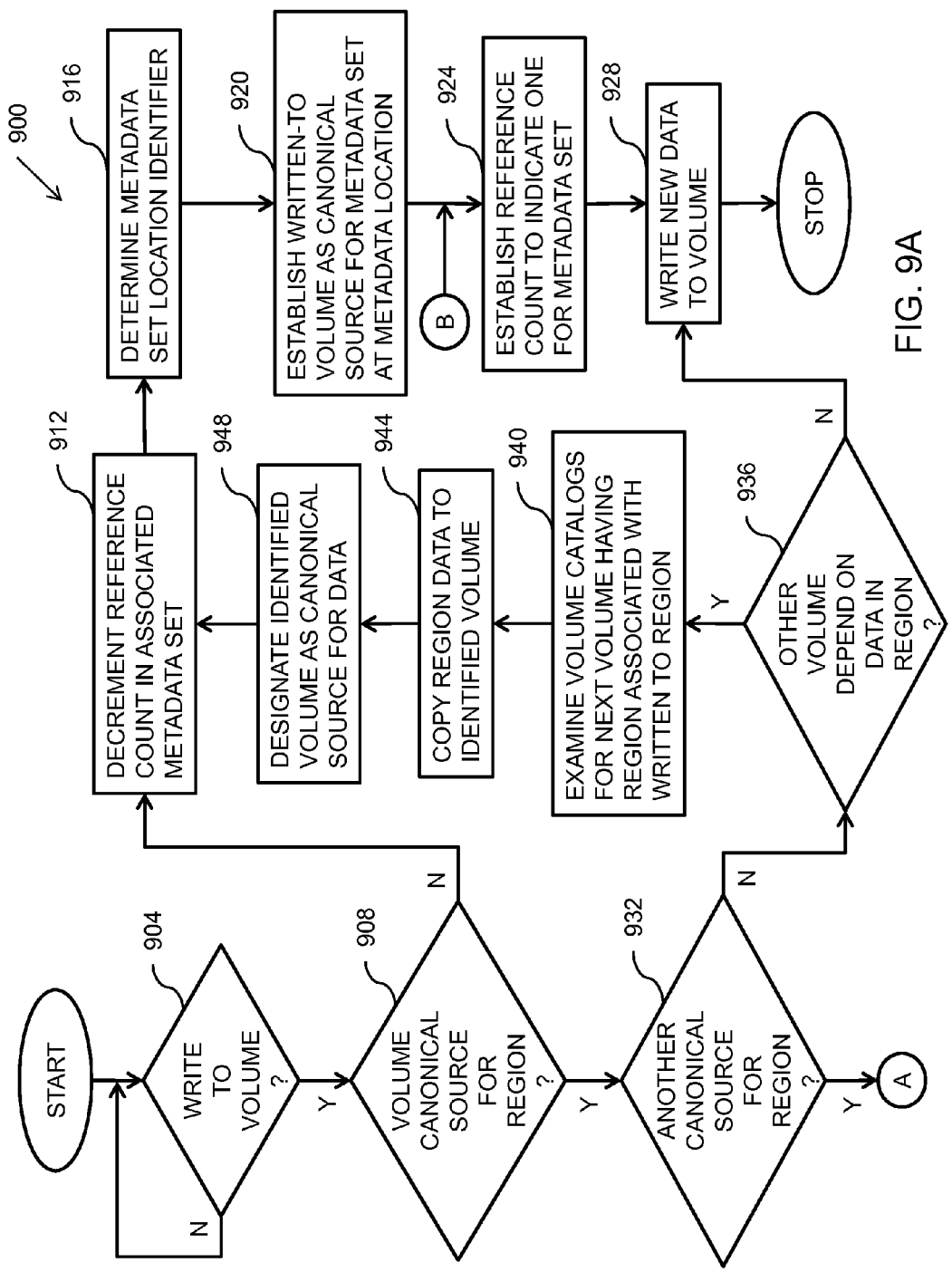
FIGS. 9A-B is a flowchart illustrating an example process for source cleaning cascaded volumes.
Figure 9B:
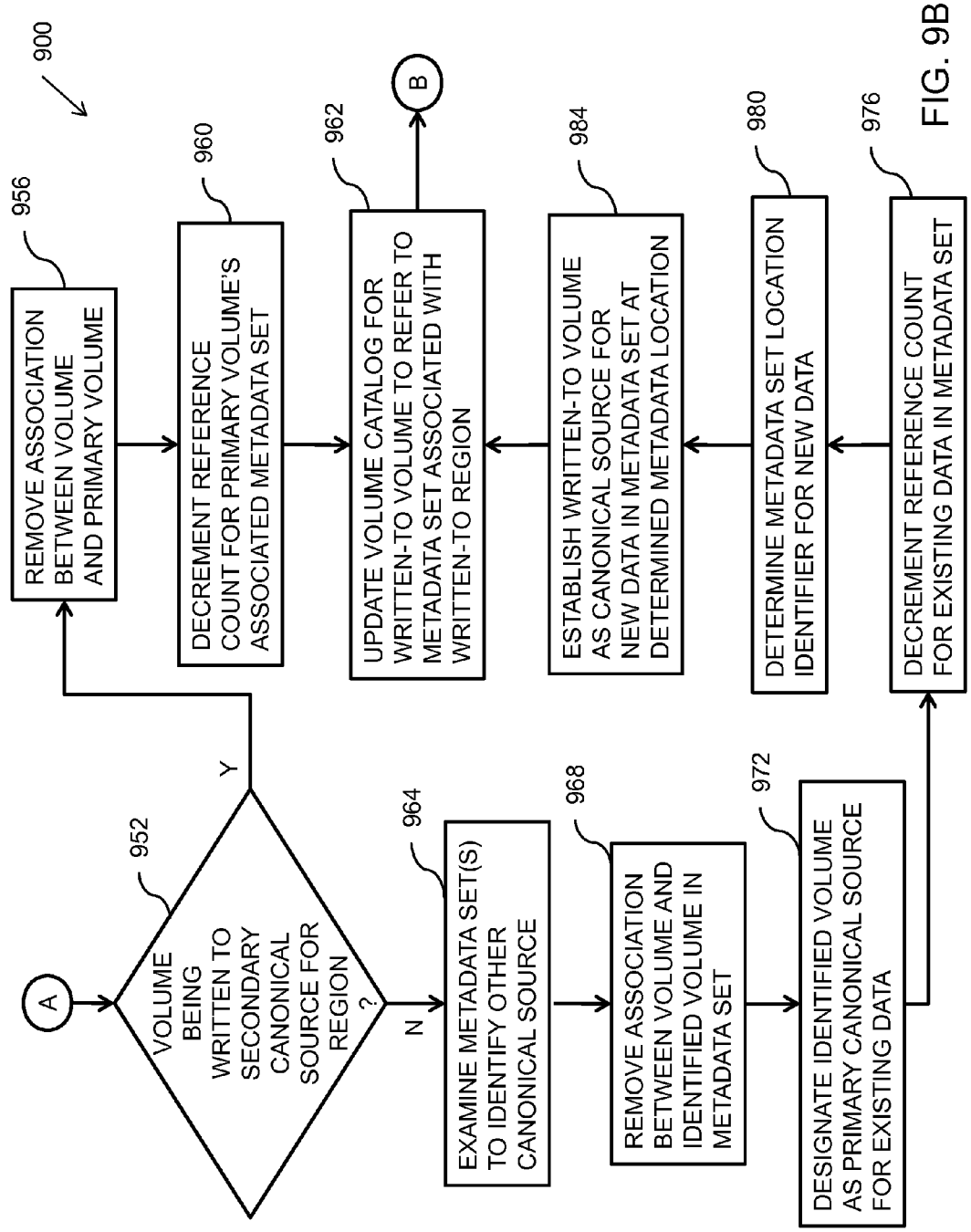

FIG. 9 illustrates an example process 900 for source cleaning cascaded volumes. Process 900 may, for example, be performed by a storage system similar to storage system 120.

Process 900 calls for determining whether a write for a volume has been received (operation 904). A write for a volume may, for example, arrive from an external system. If a write for a volume has not been received, process 900 calls for waiting for a write for a volume.

Once a write for a volume has been received, process 900 calls for determining whether the volume is a canonical source for the region being written to (operation 908).

If the volume is not a canonical source for the region being written to, process 900 calls for decrementing a reference count in a metadata set associated with the region (operation 912) and determining a metadata set location identifier (operation 916). The metadata set location identifier may be a new identifier or a recycled one. Process 900 also calls for establishing the written-to volume as the canonical source for the metadata set at the metadata location (operation 920) and establishing the reference count to indicate that one volume region refers to the new metadata set (operation 924). For example, a reference count may be set to one. Process 900 additionally calls for writing the new data to the volume (operation 928). Process 900 is then at an end.

If, however, the volume is a canonical source for the region being written to, process 900 calls for determining whether there is another canonical source for the region (operation 932). Determining whether there is another canonical source may, for example, be accomplished by searching for a metadata set identifier in the metadata set.

If there is not another canonical source for the region being written to, process 900 calls for determining whether another volume depends on the data in the region (operation 936). Determining whether another volume depends on the data in the region may, for example, be accomplished by examining a reference count in the associated metadata set. If another volume does not depend on the data in the region, process 900 calls for writing the new data to the volume (operation 928). Process 900 is then at an end.

If, however, another volume does depend on the data in the region, process 900 calls for examining volume catalogs to determine the next volume having a region associated with the written-to region (operation 940). Examining the volume catalogs for a region associated with the written-to region may, for example, be accomplished by searching the volume catalogs for an identifier for the metadata set associated with the written-to region. In particular implementations, this may be accomplished by examining the volume catalogs at the same location that the written-to region occupies in its volume catalog.

Process 900 also calls for copying the written-to region's existing data to the identified volume (operation 944) and designating the identified volume as the canonical source for the existing data in the associated metadata set (operation 948). Process 900 additionally calls for decrementing a reference count in the associated metadata set (operation 912), determining a metadata location identifier (operation 916), establishing the written-to volume as the canonical source for the metadata set at the new metadata location (operation 920), setting the reference count to one for the new metadata set (operation 924), and writing the new data to the volume (operation 928). Process 900 is then at an end.

If, however, there is another canonical source for the region being written to, process 900 calls for determining whether the volume being written to is a secondary canonical source for the region (operation 952). A volume may, for example, be determined to be a secondary canonical source if it is not the first in a chain of canonical sources.

If the volume being written to is a secondary canonical source for the region being written to, process 900 calls for removing an association between the volume and the primary canonical source volume (operation 956). Removing the association may, for example, be accomplished by deleting an identifier for the secondary canonical source volume from the metadata set for the primary volume. Process 900 also calls for decrementing a reference count in the metadata set for the primary volume's associated region (operation 960), updating a volume catalog for the written-to volume to refer to (e.g., point to) the metadata set associated with the written-to region (operation 962), setting a reference count to one for the metadata set associated with the written-to volume (operation 924), and writing the new data to the written-to volume (operation 928). Process 900 is then at an end.

If the volume being written to is not a secondary canonical source for the region being written to, process 900 calls for examining at least one metadata set to identify another canonical source (operation 964). Identifying another canonical source may, for example, include finding an identifier for another metadata set in the metadata set associated with the region being written to. Process 900 also calls for removing an association between the volume being written to and the identified volume in the metadata set associated with the region being written to (operation 968). Removing the association may, for example, be accomplished by deleting an identifier for a metadata set associated with the identified volume from the metadata set for the primary canonical source volume. Process 900 additionally calls for designating the identified volume as the primary canonical source for the existing data in the metadata set (operation 972) and decrementing a reference count in the metadata set (operation 976). Process 900 also calls for determining a metadata set location identifier for the new data (operation 980), establishing the written-to volume as the canonical source for the new data for the metadata set associated with the metadata location identifier (operation 984), updating a volume catalog for the written-to volume to refer to the metadata set associated with the written-to region (operation 962), setting a reference count to one for the metadata set associated with the written-to volume (operation 924), and writing the new data to the written-to volume (operation 928). Process 900 is then at an end.

Process 900 may operate as long as backup volumes are active. Thus, process 900 can be repeated a large number of times during normal operations.

Although process 900 illustrates one example process for source cleaning cascaded volumes, other processes for source cleaning cascaded volumes may include fewer, additional, and/or a different arrangement of operations. For example, a process may not include determining whether there is another canonical source. This may, for example, occur when clone copies are not being used to generate the cascaded volumes. As another example, a process may include checking whether another volume depends on the region to be written to before checking whether the region is a canonical source. If no other regions depend on the region to be written to, it may be written to without concern for affecting other volumes. An additional example, the write of the new data may be performed before the metadata set is updated, unless the data in the region to be written to needs to be moved before performing the write.

Figure 10A:
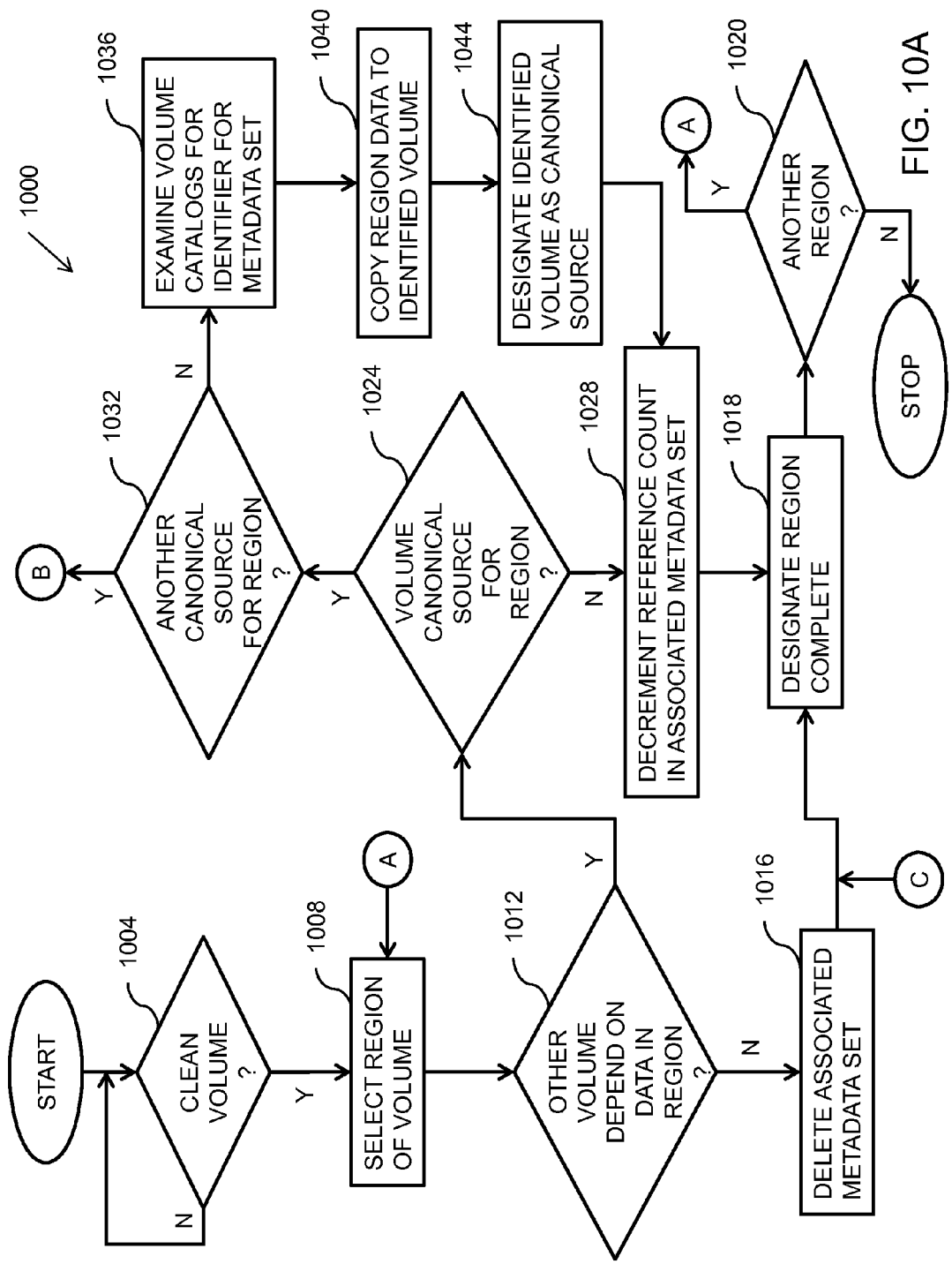
FIGS. 10A-B is a flowchart illustrating another example process for source cleaning cascaded volumes.
Figure 10B:
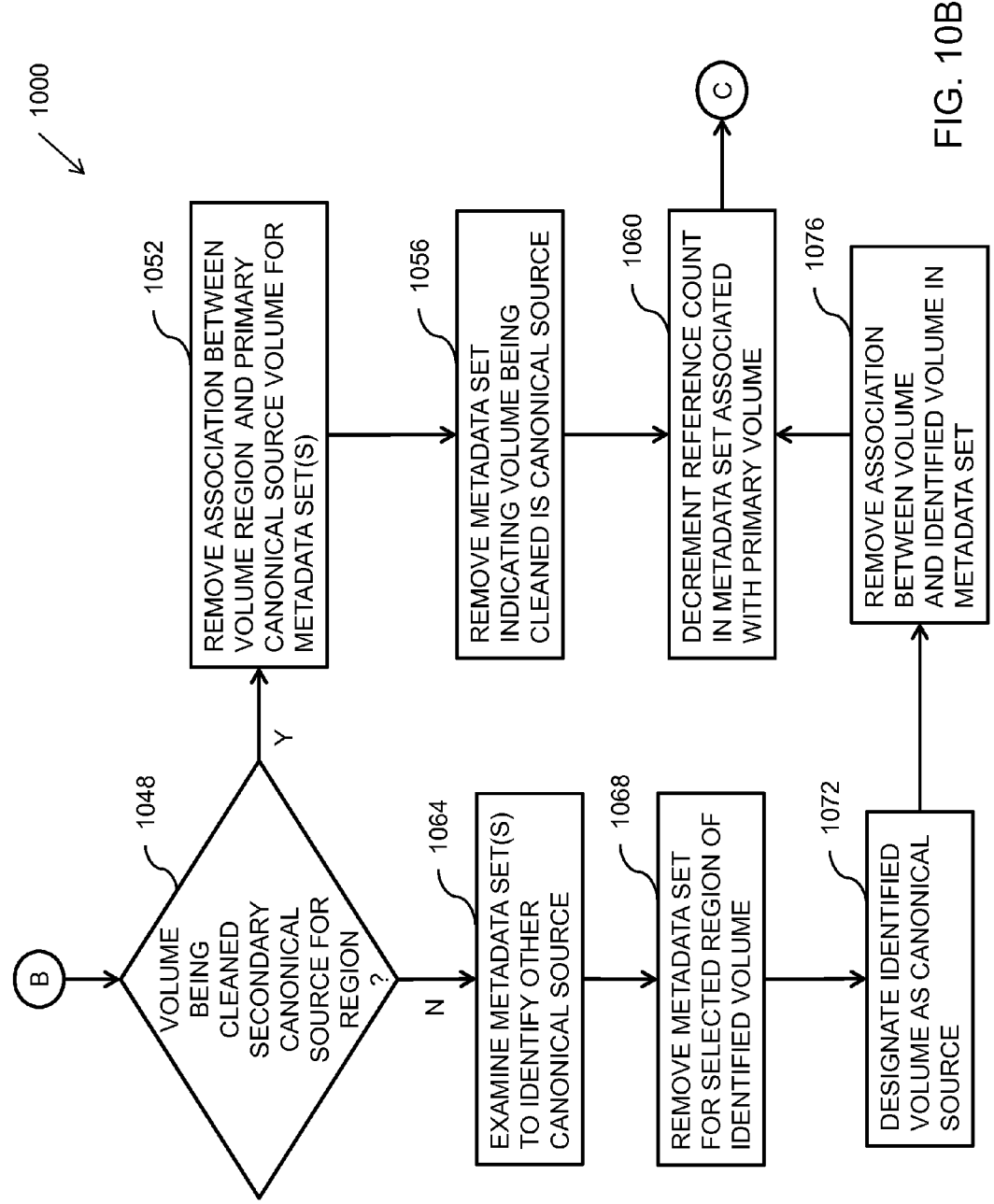

FIGS. 10A-B illustrate another example process 1000 for source cleaning cascaded volumes. Process 1000 may, for example, be performed by a system similar to storage system 120. Moreover, process 1000 may be used in conjunction with process 900.

Process 1000 calls for determining whether a volume is to be cleaned (operation 1004). A volume may, for example, need to be cleaned if it is to be removed from a cascade or to be restarted. If a volume is not to be cleaned, process 1000 calls for waiting for a volume to be cleaned.

Once a volume is to be cleaned, process 1000 calls for selecting a region of the volume to clean (operation 1008). This may, for example, occur by selecting the first region on the volume, the last region on the volume, or a region in between. Process 1000 also calls for determining whether another volume depends on the data in the region (operation 1012). This may, for example, be accomplished by decrementing a reference count associated with the region, which may, for example, be stored in a metadata set associated with the volume region, and determining whether the reference count has reached zero.

If another volume is does not depend on the data in the region, process 1000 calls for deleting the associated metadata set (operation 1016), designating the region as complete (operation 1018), and determining whether there is another region in the volume (operation 1020). That is, if no other volume depends on the selected region, it may be deleted without consequence to the other cascaded volumes. Designating the region as complete may, for example, occur by setting an indicator (e.g., number or flag) in an array or notifying another process that the selected region has been cleaned. A complete region may, for example, has its associated storage freed (e.g., if the disk is virtualized). If there is not another region in the volume, process 1000 is at an end. If there is another region in the volume, process 1000 calls for selecting another region (operation 1008) and determining whether another volume depends on the data in that region (operation 1012).

If another volume depends on the data in a region, process 1000 calls for determining whether the volume being cleaned is a canonical source for the selected region (operation 1028). If the volume being cleaned is not a canonical source for the region, process 1000 calls for decrementing a reference count for the associated metadata set (operation 1028) and again designating the region as complete (operation 1028) and determining whether there is another region in the volume (operation 1020). This is possible because another volume region stores the associated data.

If the volume being cleaned is a canonical source for the selected region, process 1000 calls for determining whether there is another canonical source for the region. If there is not another canonical source for the region, process 1000 for examining volume catalogs for an identifier for the associated metadata set (operation 1036). Process 1000 also calls for copying the data in the region being written to the identified volume (operation 1040) and designating the identified volume as the canonical source in the associated metadata set (operation 1044). Process 1000 additionally calls for decrementing a reference count for the associated metadata set (operation 1028) and again designating the region as complete (operation 1018) and determining whether there is another region in the volume (operation 1020).

If, however, there is another canonical source for the region being cleaned, process 1000 calls for determining whether the volume being cleaned is a secondary canonical source for the region (operation 1048). If the volume being cleaned is a secondary canonical source, process 1000 calls for removing an association between the volume being cleaned and the primary canonical source volume for at least one metadata set associated with the primary canonical source volume (operation 1052). Process 1000 also calls for removing a metadata set indicating that the volume region being cleaned is a canonical source (operation 1056) and decrementing a reference count in the metadata set associated with the primary canonical source volume (operation 1060). Process 1000 additionally calls for designating the region as complete (operation 1018) and checking for another volume region to be cleaned (operation 1020).

If the volume being cleaned is not a secondary canonical source, process 1000 calls for examining one or more metadata sets to identify another canonical source (operation 1064). For example, the metadata set associated with the region being cleaned may be examined for an identifier of a metadata set for another canonical source. As another example, the metadata sets may be individually be examined to identify a metadata set of another canonical source. Once an appropriate metadata set has been identified, a volume and region may be extracted from the identified metadata set. Process 1000 also calls for removing a metadata set indicating that the volume region being cleaned is a canonical source for the selected region (operation 1068) and designating the identified volume as the canonical source for the existing data (operation 1072). For example, an identifier for identified volume may be substituted for the identifier of the volume being removed in an associated metadata set.

Process 1000 additionally calls for removing an association between the volume being cleaned and the identified volume in at least one metadata set (operation 1076) and decrementing a reference count in the metadata set associated with the primary canonical source volume, which has just been updated (operation 1060). Process 1000 additionally calls for designating the region as complete (operation 1018) and checking for another volume region to be cleaned (operation 1020).

Process 1000 may operate as long as backup volumes are active. Thus, process 1000 can be repeated a large number of times during normal operations.

Although process 1000 illustrates one example process for source cleaning cascaded volumes, other processes for source cleaning cascaded volumes may include fewer, additional, and/or a different arrangement of operations. For example, a process may not include determining whether there is another canonical source. This may, for example, occur when clone copies are not being used to generate the cascaded volumes. As another example, a process may include checking whether a volume is a canonical source before checking whether another region depends on the selected. If a region is not a canonical source, it may be deleted written without affecting other volumes. An additional example, a metadata set does not have to be removed. It may, for instance, become inactive and/or overwritten at a later point.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

Figure 11:
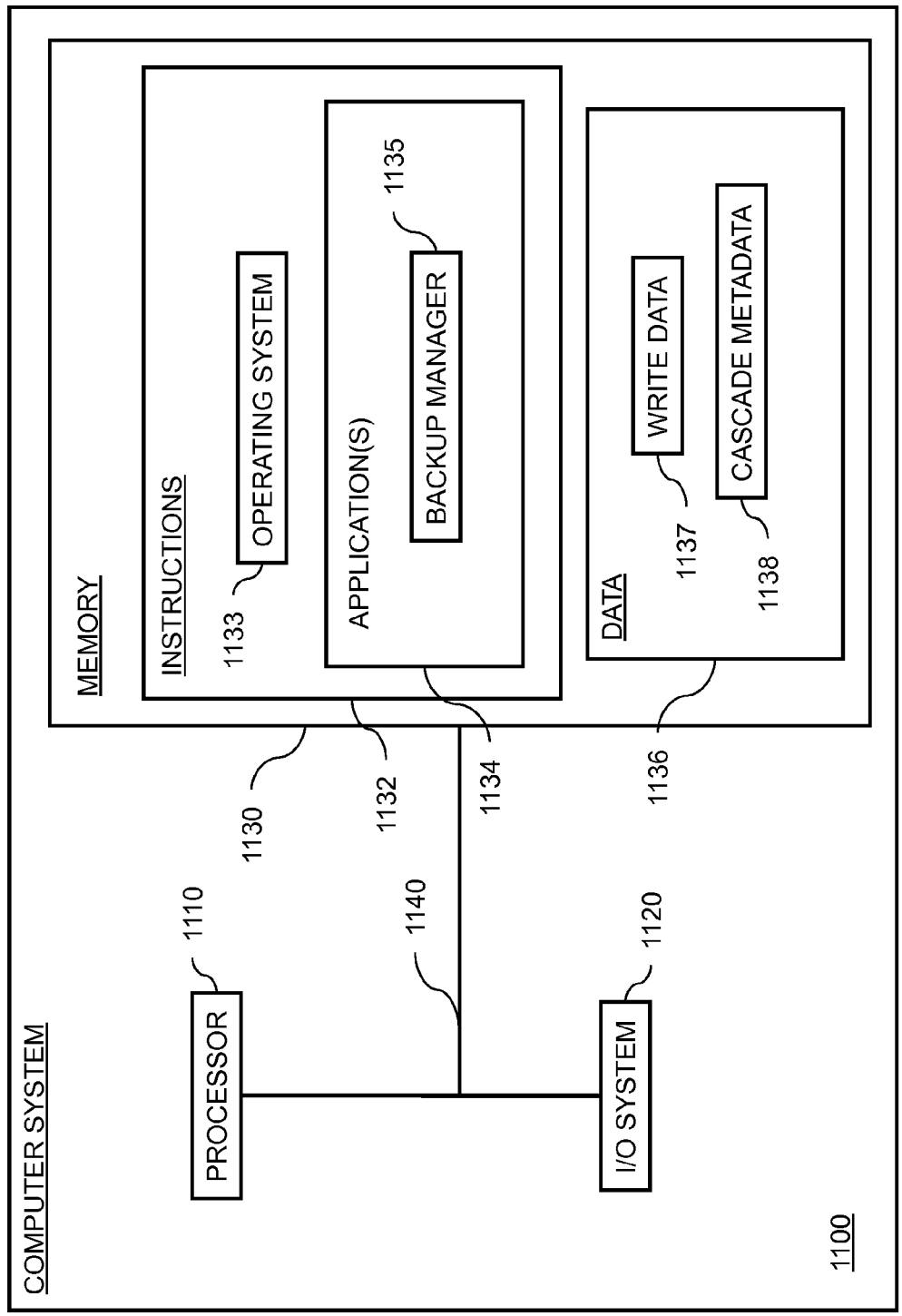
FIG. 11 is a block diagram illustrating an example computer system for source cleaning cascaded volumes.

FIG. 11 illustrates an example computer system 1100 for managing source cleaning for cascaded volumes. Computer system 1100 may, for example, illustrate some of the components of a storage controller of a storage system.

System 1100 includes a processor 1110, an input/output system 1120, and memory 1130, which are coupled together by a network 1140. As illustrated, computer system 1100 is functioning as a storage controller of a storage system.

Processor 1110 typically includes a logical processing unit (e.g., an arithmetic logic unit) that processes data under the direction of program instructions (e.g., from software and/or firmware). For example, processor 1110 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Input/output system 1120 may include one or more communication interfaces and/or one or more other user interfaces. A communication interface may, for instance, be a network interface card (whether wireless or wireless) or a modem. A user interface could, for instance, be a user input device (e.g., a keyboard, a keypad, a touchpad, a stylus, a mouse, or a microphone) or a user output device (e.g., a monitor, a display, or a speaker). In general, input-output system 1120 may be any combination of devices by which a computer system can receive and output data.

Memory 1130 may, for example, include random access memory (RAM), read-only memory (ROM), flash memory, and/or disc memory. Various items may be stored in different portions of the memory at various times. Memory 1130, in general, may be any combination of devices for storing data.

Memory 1130 includes instructions 1132 and data 1136. Instructions 1132 include an operating system 1133 (e.g., Windows, Linux, or Unix) and applications 1134, which include a backup memory 1135. Data 1136 includes the data required for and/or produced by applications 1134, including write data 1137 and cascade metadata 1138.

Network 1140 is responsible for communicating data between processor 1110, input/output system 1120, and memory 1130. Network 1140 may, for example, include a number of different types of busses (e.g., serial and parallel).

In certain modes of operation, processor 1110 is able to receive writes (e.g., from an external system) and prepare them for storage managed by the computer system. Additionally, processor 1110, according to backup manager 1135, may generate backup volumes for a primary volume in the storage and generate metadata about each volume region that indicates which regions refer to each other and which regions are canonical regions. In particular implementations, for example, each cascaded volume may have an associated volume catalog that maps the volume's regions to one of a number of metadata sets, the volume catalogs and the metadata sets together forming cascade metadata 1138.

Using cascade metadata 1138, processor 1110 may, among other things, determine whether data needs to be copied when a cascaded volume is written to. For example, if the volume region being written to is not a canonical source, the data therein may not have to be copied. As another example, if the volume region being written to is a canonical source but no other volume relies on it, the data therein may not have to be copied. Additionally, if the volume being written to is a canonical source but an alternate canonical source exists, data may not have to be copied.

Processor 1110 may also use the cascade data when cleaning a volume (e.g., when the volume is being deleted). For example, the processor may use the data to determine that no other region relies on a volume region, and thus, the volume region may be deleted without affecting the rest of the cascade. As another example, the processor may use the cascade metadata to determine that a volume region being deleted is not a canonical source and, again, may be deleted without affecting the rest of the cascade. As a further example, the processor may use the cascade metadata to determine that a volume a canonical source, and hence, the data therein should be copied to another volume. In certain implementations, however, the processor may also use the cascade metadata to determine whether an alternate canonical source exists for a volume region, which may prevent the data in the volume region from being copied.

Processor 1110 may, for example, accomplish these operations by implementing any of the techniques discussed above, including one or more parts of processes 900-1000.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for source cleaning cascaded volumes, and several others have been mentioned or suggested. Moreover, those skilled in the art will readily recognize that a variety of additions, deletions, modifications, and substitutions may be made to these implementations while still achieving source cleaning cascaded volumes. Thus, the scope of the protected subject matter should be judged based on the following claims, which may capture one or more concepts of one or more implementations.

The invention claimed is:

1. A method comprising:
storing a primary volume and a plurality of cascaded backup volumes for the primary volume, each volume comprising a plurality of different addressable regions;
receiving writes for at least one of the volumes from an external source and preparing the writes for storage;
determining whether a write is for a volume region that is a canonical source;
if the write is for a region that is not a canonical source:
  decrementing a reference count in a metadata set associated with the region,
  determining a metadata set location identifier,
  establishing the volume of the region as a canonical source for a metadata set associated with the metadata set location identifier, and
  establishing a reference count for the metadata set to indicate that the metadata set is referred to by one volume region; and
if the write is for a region that is a canonical source:
  examining a metadata set associated with the region to determine whether another volume depends on data in the region, and
  writing the new data to the region if another volume does not depend on data in the region.

2. The method of claim 1, further comprising:
examining, if another volume does depend on data in the region, a catalog for at least one volume to determine the next volume having a region associated with the region to be written to;
copying data in the region to be written to to the identified volume;
decrementing a reference count in a metadata set associated with the region to be written to; and
designating the identified volume as a canonical source for the copied data.

3. The method of claim 1, further comprising:
determining whether another canonical source is associated with the region to be written to;
determining, if another canonical source is associated with the region to be written to, whether the volume to be written to is a secondary canonical source for the region to be written to; and
if the volume to be written to is a secondary canonical source for the region to be written to:
removing an association between the volume to be written to and a primary canonical source volume,
decrementing a reference count for a metadata set associated with a region of the primary canonical source volume associated with the region to be written to,
establishing a reference count to indicate one referring volume region for a metadata set associated with the region to be written to, and
updating a volume catalog for the volume to be written to to identify the metadata set associated with the region to be written to.

4. The method of claim 1, further comprising:
determining that a volume in the cascade needs to be cleaned;
selecting, if a volume needs to be cleaned, a region of the volume;
determining whether another volume depends on the selected region;
designating the selected region as complete if another volume does not depend on the selected region; and
determining whether another volume region needs to be cleaned.

5. The method of claim 4, further comprising:
determining, if another volume depends on the selected region, whether the volume to be cleaned is a canonical source for the selected region;
decrementing a reference count in a metadata set associated with the selected region if the volume to be cleaned is not a canonical source for the selected region; and
designating the selected region as complete.

6. The method of claim 5, further comprising:
examining, if the volume to be cleaned is a canonical source for the selected region, volume catalogs for other volumes for an identifier for a metadata set associated with the selected region;
copying data in the selected region to the identified volume;
designating the identified volume as a canonical source for a metadata set associated with the selected region; and
decrementing a reference count in the associated metadata set.

7. The method of claim 5, further comprising:
determining whether there is another canonical source for the selected region if the volume to be cleaned is a canonical source for the selected region;
determining, if another canonical source exists, whether the volume to be cleaned is a secondary canonical source for the selected region;
removing an association between the selected region and a primary canonical source volume in a metadata set associated with the primary canonical source volume if the volume being cleaned is a secondary canonical source for the selected region; and
decrementing a reference count in the metadata set associated with the primary canonical source volume.

8. A method comprising:
storing a primary volume and a plurality of cascaded backup volumes for the primary volume;
receiving writes for at least one of the volumes from an external source and preparing the writes for storage;
determining whether a write is for a volume region that is a canonical source;
if the write is for a region that is not a canonical source:
 decrementing a reference count in a metadata set associated with the region,
 determining a metadata set location identifier,
 establishing the volume of the region as a canonical source for a metadata set associated with the metadata set location identifier, and
 establishing a reference count for the metadata set to indicate that the metadata set is referred to by one volume region; and
if the write is for a region that is a canonical source:
examining a metadata set associated with the region to determine whether another volume depends on data in the region, and
 writing the new data to the region if another volume does not depend on data in the region; and further comprising:
examining, if another volume does depend on data in the region, a catalog for at least one volume to determine the next volume having a region associated with the region to be written to;
copying data in the region to be written to to the identified volume;
decrementing a reference count in a metadata set associated with the region to be written to; and
designating the identified volume as a canonical source for the copied data.

9. A method comprising:
storing a primary volume and a plurality of cascaded backup volumes for the primary volume;
receiving writes for at least one of the volumes from an external source and preparing the writes for storage;
determining whether a write is for a volume region that is a canonical source;
if the write is for a region that is not a canonical source:
 decrementing a reference count in a metadata set associated with the region,
 determining a metadata set location identifier,
 establishing the volume of the region as a canonical source for a metadata set associated with the metadata set location identifier, and
 establishing a reference count for the metadata set to indicate that the metadata set is referred to by one volume region; and
if the write is for a region that is a canonical source:
 examining a metadata set associated with the region to determine whether another volume depends on data in the region, and
 writing the new data to the region if another volume does not depend on data in the region; and further comprising:
determining that a volume in the cascade needs to be cleaned;
selecting, if a volume needs to be cleaned, a region of the volume;
determining whether another volume depends on the selected region;
designating the selected region as complete if another volume does not depend on the selected region; and
determining whether another volume region needs to be cleaned.

10. The method of claim 9, further comprising:
determining, if another volume depends on the selected region, whether the volume to be cleaned is a canonical source for the selected region;
decrementing a reference count in a metadata set associated with the selected region if the volume to be cleaned is not a canonical source for the selected region; and
designating the selected region as complete.

11. The method of claim 10, further comprising:
examining, if the volume to be cleaned is a canonical source for the selected region, volume catalogs for other volumes for an identifier for a metadata set associated with the selected region;
copying data in the selected region to the identified volume;
designating the identified volume as a canonical source for a metadata set associated with the selected region; and
decrementing a reference count in the associated metadata set.

12. The method of claim 10, further comprising:
determining whether there is another canonical source for the selected region if the volume to be cleaned is a canonical source for the selected region;
determining, if another canonical source exists, whether the volume to be cleaned is a secondary canonical source for the selected region;
removing an association between the selected region and a primary canonical source volume in a metadata set associated with the primary canonical source volume if the volume being cleaned is a secondary canonical source for the selected region; and
decrementing a reference count in the metadata set associated with the primary canonical source volume.

* * * * *